United States Patent
Woychowski et al.

(10) Patent No.: US 10,876,932 B2
(45) Date of Patent: Dec. 29, 2020

(54) VEHICLE AIRBAG TESTING DEVICES AND METHODS OF TESTING VEHICLE AIRBAGS USING THE SAME

(71) Applicant: Toyota Motor Engineering & Manufacturing North America, Inc., Plano, TX (US)

(72) Inventors: Timothy J. Woychowski, Fenton, MI (US); Gerritt B. Meyers, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 176 days.

(21) Appl. No.: 16/263,732

(22) Filed: Jan. 31, 2019

(65) Prior Publication Data
US 2020/0249131 A1     Aug. 6, 2020

(51) Int. Cl.
| G01M 17/00 | (2006.01) |
| G01M 99/00 | (2011.01) |
| G01N 3/30 | (2006.01) |
| G01M 7/08 | (2006.01) |

(52) U.S. Cl.
CPC .......... *G01M 99/008* (2013.01); *G01M 17/00* (2013.01); *G01N 3/30* (2013.01); *G01M 7/08* (2013.01)

(58) Field of Classification Search
CPC ...... G01M 99/008; G01M 17/00; G01M 7/08; G01N 3/30
See application file for complete search history.

(56) References Cited

U.S. PATENT DOCUMENTS

| 6,023,984 A | 2/2000 | Mazur et al. |
| 6,672,177 B2 | 1/2004 | Hutchenreuther et al. |
| 7,610,821 B2 | 11/2009 | Klein |
| 8,056,427 B2 | 11/2011 | Wang et al. |
| 9,715,838 B2 | 7/2017 | Below et al. |
| 2006/0028005 A1 | 2/2006 | Dell' Eva et al. |
| 2017/0241861 A1 | 8/2017 | Aekbote et al. |

FOREIGN PATENT DOCUMENTS

| CN | 202351051 U | 7/2012 |
| CN | 202791231 U | 3/2013 |
| CN | 203455171 U | 2/2014 |
| CN | 105004502 A | 10/2015 |
| KR | 20010059786 A | 7/2001 |

OTHER PUBLICATIONS

Microsys, Linear Impactor & Body Block Test System, Apr. 2013, 2 pages.

*Primary Examiner* — Jamel E Williams
(74) *Attorney, Agent, or Firm* — Dinsmore & Shohl LLP

(57) ABSTRACT

A device for testing vehicle airbags includes a pusher plate that has first mounting holes and second mounting holes, a first pin received in one of the first mounting holes, a second pin received in one of the second mounting holes, a first magnet coupled to the pusher plate, and a second magnet coupled to the pusher plate. The device includes a first mass received on the first pin and secured to the pusher plate by the first magnets prior to and during acceleration of the pusher plate, and a second mass separate from the first mass and received on the second pin, the second mass secured to the pusher plate by the second magnets. Deceleration of the pusher plate causes the first mass and the second mass to release from the pusher plate. The device includes an accelerator coupled to the pusher plate and a vehicle airbag deployment device.

20 Claims, 10 Drawing Sheets

VEHICLE AIRBAG TESTING DEVICES AND METHODS OF TESTING VEHICLE AIRBAGS USING THE SAME

TECHNICAL FIELD

The present specification generally relates to devices and systems for testing vehicle airbags and methods of testing vehicle airbags using the devices and systems.

BACKGROUND

Vehicles such as automobiles include vehicle airbags that are designed to deploy in the event of a vehicle collision to reduce or prevent injuries to occupants of the vehicle. In particular, vehicle airbags are designed to reduce the probability of an occupant's head or upper body striking the interior of the vehicle during a vehicle collision. To function properly to minimize injuries to the vehicle occupant caused by contact with the vehicle interior during a vehicle collision, vehicle airbags must be correctly tuned with respect to geometry and positioning of the vehicle airbag and timing of the vehicle airbag. Many separate tests of the vehicle airbag may be necessary to correctly tune the geometry, placement, and timing of the vehicle airbag.

Vehicle airbags can be tested using a full vehicle colision test. During a full vehicle collision test, an Anthropomorphic Test Device (ATD) torso, such as an AF05 collision test dummy, is placed into a full-sized vehicle and the vehicle is accelerated and impacted with a stationary or moving mass to simulate the vehicle collision. Impacting the full vehicle with the mass damages the vehicle, rendering the vehicle ineffective for use in subsequent testing. Correctly tuning a vehicle airbag includes tuning the pressure, timing, geometry, placement, and trajectory of the vehicle airbag. Tuning each of these parameters can require repetitive testing, which can be costly to do through full vehicle collision testing exclusively.

SUMMARY

Thus, there is a continuing need for devices and systems for testing vehicle airbags, in particular devices and systems for conducting component testing of vehicle airbags that produce test results that closely model test data obtained from full vehicle collision tests. The devices and systems disclosed herein include a pusher plate, to which a first mass (head form) and a second mass (body block), which is separate from the first mass, can be temporarily and removably attached. An accelerator can be coupled to the pusher plate to accelerate the pusher plate to a target speed and then decelerate the pusher plate to release the first mass and second mass from the pusher plate. After release, the first mass and second mass each undergo free flight along separate ballistic pathways into contact with a vehicle airbag deployed by a vehicle airbag deployment device. By launching a first mass and a second mass independently in free flight at the deploying vehicle airbag, the devices and systems disclosed herein produce test results that more closely model the results obtained from full vehicle collision testing compared to conventional airbag component testers. Additionally, the devices a systems disclosed herein may also reduce the costs the testing required to correctly tune a vehicle airbag by providing data comparable to full vehicle collision testing without the expense of providing multiple full vehicle mock-ups to complete the testing.

According to one or more aspects, a device for testing vehicle airbags may include a pusher plate that includes a plurality of first mounting holes arranged on the pusher plate, a plurality of second mounting holes arranged on the pusher plate, a first pin received in at least one of the plurality of first mounting holes, a second pin received in at least one of the plurality of second mounting holes, at least one first magnet operatively coupled to the pusher plate, and at least one second magnet operatively coupled to the pusher plate. The device may further include a first mass received on the first pin and the at least one first magnet secures the first mass to the pusher plate when the first mass is received on the first pin prior to and during acceleration of the pusher plate. The device may also include a second mass separate from the first mass and received on the second pin. The at least one second magnet may secure the second mass to the pusher plate when the second mass is received on the second pin prior to and during acceleration of the pusher plate. Deceleration of the pusher plate may cause the first mass and the second mass to release from the pusher plate.

According to one or more other aspects, a system for testing vehicle airbags may include the device for testing vehicle airbags of the previous aspect coupled to an accelerator operable to accelerate the pusher plate to a target velocity and then rapidly decelerate the pusher plate. The device may include a plurality of first mounting holes arranged on the pusher plate, a plurality of second mounting holes arranged on the pusher plate, a first pin received in at least one of the plurality of first mounting holes, a second pin received in at least one of the plurality of second mounting holes, at least one first magnet operatively coupled to the pusher plate, and at least one second magnet operatively coupled to the pusher plate. The device may further include a first mass received on the first pin and the at least one first magnet secures the first mass to the pusher plate when the first mass is received on the first pin prior to and during acceleration of the pusher plate. The device may also include a second mass separate from the first mass and received on the second pin. The at least one second magnet may secure the second mass to the pusher plate when the second mass is received on the second pin prior to and during acceleration of the pusher plate. Deceleration of the pusher plate may cause the first mass and the second mass to release from the pusher plate. The system may further include a vehicle airbag deployment device spaced apart from the pusher plate and positioned facing the pusher plate, a processor communicatively coupled to at least the accelerator and the vehicle airbag deployment device, one or more memory modules communicatively coupled to the processor, and machine readable instructions stored in the one or more memory modules. When executed by the processor, the machine readable instructions may cause the system to accelerate the pusher plate to a target velocity, decelerate the pusher plate to cause the first mass and the second mass to release from the pusher plate, and deploy a vehicle airbag from the vehicle airbag deployment device into a ballistic pathway of the first mass, the second mass, or both after release of the first mass and the second mass from the pusher plate.

According to still another aspect of the present disclosure, a method of testing a vehicle airbag includes securing a first mass to a pusher plate at a first position. The pusher plate may include a plurality of first mounting holes arranged on the pusher plate, a plurality of second mounting holes arranged on the pusher plate, a first pin received in at least one of the plurality of first mounting holes, a second pin received in at least one of the plurality of second mounting holes, at least one first magnet operatively coupled to the pusher plate, and at least one second magnet operatively coupled to the pusher plate. The first mass may be received on the first pin and secured to the pusher plate by the at least one first magnet. The method may further include securing a second mass to the pusher plate at a second position. The second mass may be separate from the first mass, and the second mass may be received on the second pin and secured to the pusher plate by the at least one second magnet. The method may further include accelerating the pusher plate to a target velocity, decelerating the pusher plate to cause the first mass and the second mass to release from the pusher plate, and deploying a vehicle airbag in a ballistic pathway of the first mass, the second mass, or both released from the pusher plate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DESCRIPTION

Figure 1:
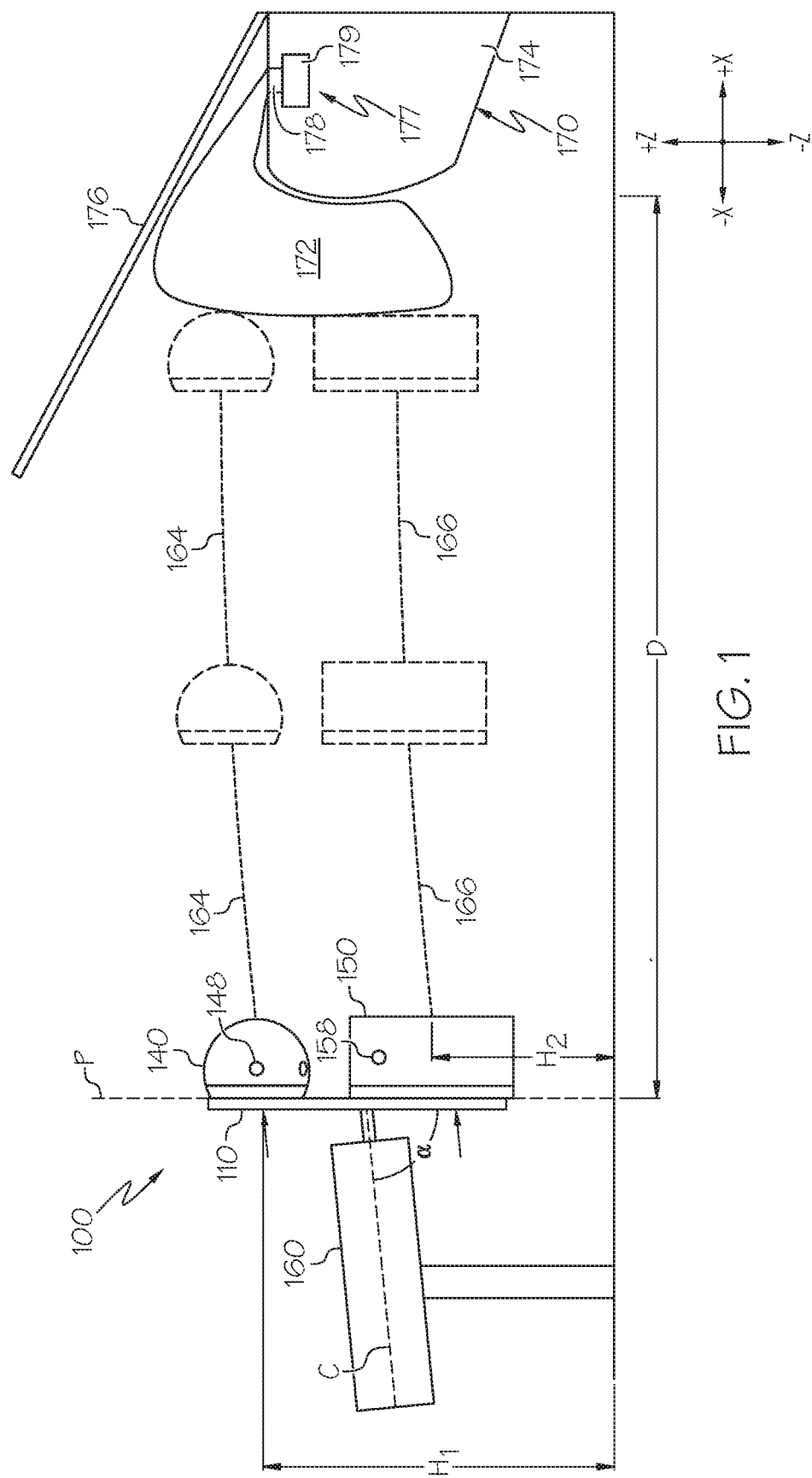
FIG. 1 schematically depicts device for testing a vehicle airbag, according to one or more embodiments shown and described herein.

The present disclosure is directed to devices and systems for testing vehicle airbags and methods of testing vehicle airbags. The devices, systems, and methods disclosed herein are capable of producing vehicle airbag test data comparable to data collected during a full vehicle collision test at a substantially reduced cost compared to full vehicle collision testing. Referring to FIG. 1, an embodiment of device 100 according to the present disclosure for testing a vehicle airbag is schematically depicted. The device 100 includes a pusher plate 110 that may be coupled to an accelerator 160, a first mass 140 operatively coupled to the pusher plate 110, and a second mass 150 separate from the first mass 140 and also operatively coupled to the pusher plate 110. Acceleration of the pusher plate 110 by the accelerator 160 to a target velocity followed by sudden and rapid deceleration of the pusher plate causes release of the first mass 140 and the second mass 150 from the pusher plate 110 and launch of the first mass 140 and second mass 150 along separate ballistic pathways towards a vehicle airbag 172 deployed in the ballistic pathways of the first mass 140 and second mass 150 by a vehicle airbag deployment device 170. Systems and methods of testing a vehicle airbag that include the device 100 of FIG. 1 are also disclosed herein.

As previously described, vehicle airbags have traditionally been tested and fine-tuned through full vehicle collision testing in which an anthropomorphic dummy is placed in the full vehicle and the full vehicle is accelerated and impacted with a stationary or moving barrier. Sensors in the anthropomorphic dummy record position, velocity, force, or other data during impact of the dummy with the vehicle airbag. The data is then used to adjust the geometry, positioning, trajectory, pressure, activation, timing, or other parameter of the vehicle airbag device to properly tune the vehicle airbag.

In a typical full vehicle collision test, the anthropomorphic dummy, such as an AF05 dummy, includes at least a torso portion and a head portion with sensors positioned in each of the head portion and torso portion. The head portion of the AF05 dummy and other anthropomorphic dummies is generally movable relative to the torso and are not rigidly attached, even though the head portion and torso portion may be connected to each other. This enables the impacts of the head and torso portions of the AF05 dummy with the vehicle airbag to be relatively independent.

The impact forces to the head produce more severe injuries to an occupant of the vehicle during a vehicle crash compared to the impact forces on the torso of the occupant. Therefore, the impact forces to the head region of the dummy are of particular interest when properly tuning a vehicle airbag. The benefit of a full vehicle collision test using an anthropomorphic dummy is that the effects of the vehicle airbag deployment on the head of the vehicle occupant can be isolated and studied independent of the forces acting on the body portion. Because the head portion is movable relative to the torso portion of the anthropomorphic dummy, the impact forces between the head portion and the vehicle airbag can be measured independently of the impact forces between the torso portion and the vehicle airbag.

Figure 12:
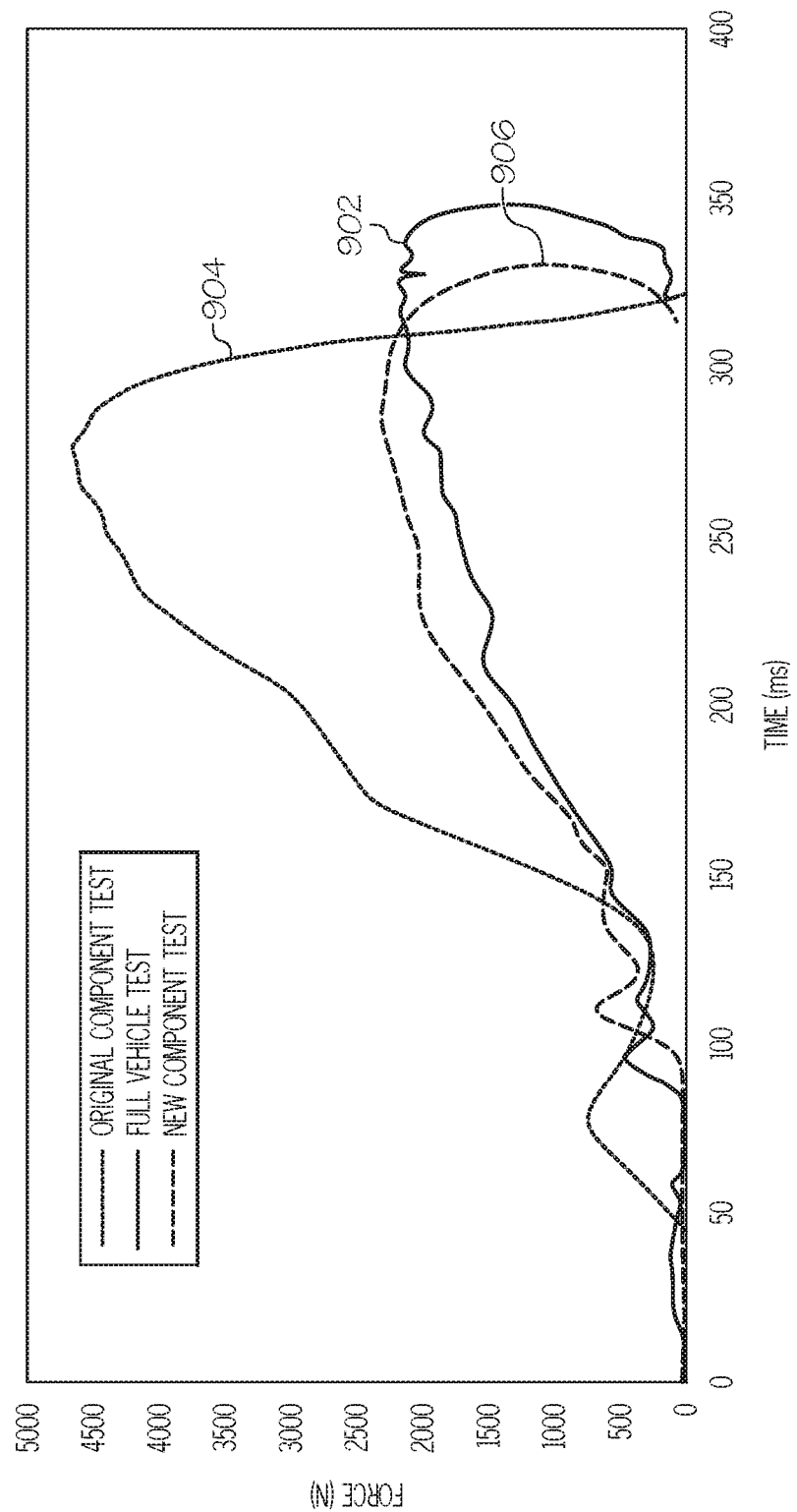
FIG. 12 graphically depicts force (y-axis) as a function of time (x-axis) for a head form during a full vehicle collision test, an airbag test performed using a conventional airbag component tester, and a vehicle airbag component test performed using the device of FIG. 1, according to one or more embodiments shown and described herein.

FIG. 12 provides test data showing the impact force (y-axis) on the head region as a function of time (x-axis) for an AF05 dummy in a full vehicle collision test (reference 902). For the full vehicle collision test 902, FIG. 12 shows the force on the head portion of the AF05 dummy gradually increasing from about 80 milliseconds (ms) to about 340 ms with a maximum force of less than 2500 Newtons (N).

As previously discussed herein, correctly tuning the geometry and timing of a vehicle airbag 172 can be very costly when accomplished using full vehicle collision testing. Impact of the full vehicle with the barrier damages the vehicle, which can render the full vehicle unusable for further collision testing. Thus, each iteration of the testing process for the vehicle airbag expends one new full vehicle.

The cost of testing and properly tuning vehicle airbags can be reduced through component testing, in which the vehicle airbag is tested and tuned by impacting a test mass with the vehicle airbag instead of colliding a full vehicle with the barrier. In component testing of vehicle airbags, several iterations of the vehicle airbag testing can be performed without damaging full vehicles, which can reduce the number of full vehicles required to be damaged in order fine-tune the vehicle airbag module.

In conventional airbag component testing, conventional airbag component testers generally include a mass that is a single unitary mass having a head portion rigidly coupled to a body portion. The mass is coupled to a pusher that pushes the mass into the vehicle airbag at a specific velocity during deployment of the vehicle airbag. The pusher pushes the mass into the vehicle airbag without any free flight of the mass into the vehicle airbag. In other words, in the conventional airbag component tester, the unitary mass is rigidly coupled to the pusher throughout contact of the unitary mass with the vehicle airbag. Conventional airbag component testing performed using the conventional airbag component testers provides test date that correlates very poorly to full vehicle collision test data with respect to the forces experienced by the head portion of the mass during the contact with the vehicle airbag.

Referring again to FIG. 12, test data for a conventional airbag component tester showing the impact force on the head portion of the unitary mass as a function of time is provided and identified by reference number 904. The data for conventional component tester was obtained using the conventional airbag component tester previously described operated under conditions that produce a total energy into the vehicle airbag equal to the total energy into the vehicle airbag measured in the full vehicle collision test that produced data series 902. In other words, the total energy into the vehicle airbag was maintained constant. As shown in FIG. 12, the results obtained by the conventional component tester (904) do not correlate well with the test data obtained from a full vehicle collision test 902 with respect to the maximum force and the force profile. In particular, airbag component testing using the conventional airbag component tester (904) results in forces on the head portion that are more than two times greater than the maximum forces measured for the head portion during the full vehicle collision test (902). Additionally, the force profile for the conventional component tester 904 shows an abrupt increase in impact force at about 150 ms compared to the more gradual increase in the impact force for the full vehicle collision test 902.

One problem with conventional airbag component testers is that the head portion is rigidly coupled to the body portion and, therefore, does not independently contact the vehicle airbag. Thus, during impact of the mass with the vehicle airbag, the vehicle airbag exerts a counterforce against the mass that is equal and opposite to the force exerted by the entire unitary mass (which includes the body portion and the head portion rigidly coupled to the body portion) against the vehicle airbag. The impact forces measured by sensors in the head portion of the unitary mass are, therefore, indicative of the entire force of the impact between the unitary mass and the vehicle airbag, not just the impact forces experienced by the head portion only.

Additionally, since the unitary mass is pushed into the vehicle airbag without any free flight of the unitary mass, the force data obtained from the conventional airbag component testing may be influenced by the operation and movement of the pusher portion of the conventional airbag component tester. The results from a conventional airbag component tester poorly correlate to the impact forces experienced by the head portion of the AF05 dummy during a full vehicle collision test.

In some cases, the conventional airbag component tester may be configured to impact only a head portion into the vehicle airbag to study the forces on the head portion. However, in the full vehicle collision test as well as in real world vehicle crashes, both the body and the head contact the airbag. Thus, proper tuning of the vehicle airbag must take into consideration the effects of impact of the body portion with the vehicle airbag on the forces experienced by the head portion. Eliminating the body portion from the test would further result in data that does not correlate well with data obtained from the full vehicle collision test.

The devices, systems, and methods for testing vehicle airbags disclosed herein produce test data on forces experienced by the head portion that closely correlate to data generated during a full vehicle collision test at the same total energy delivered into the vehicle airbag. Referring again to FIG. 1, the devices 100 of the present disclosure include the first mass 140 for the head portion that is separated and decoupled from the second mass 150 used for the body portion. This allows the forces on the head (e.g., forces experienced by the first mass 140) to be measured and studied separately from the forces experienced by the torso (second mass 150). Additionally, the first mass 140 and second mass 150 are both launched in free flight along ballistic pathways before contacting the vehicle airbag 172, which better approximates the actual conditions experienced by the AF05 dummy during a full vehicle collision test.

Referring to FIG. 1, as previously discussed, the device 100 includes the pusher plate 110. The pusher plate 110 includes a plurality of first mounting holes 114, a plurality of second mounting holes 116, a first pin 130 received in at least one of the plurality of first mounting holes 114, a second pin 132 received in at least one of the plurality of second mounting holes 116, at least one first magnet 134 operatively coupled to the pusher plate 110, and at least one second magnet 136 operatively coupled to the pusher plate 110. The device 100 includes a first mass 140 and a second mass 150, which are coupled to the pusher plate 110 by the first magnet 134 and the second magnets 136, respectively. The first mass 140 is separate from the second mass 150 so that the forces experienced by the first mass 140 can be studied independently of the forces acting on the second mass 150. Acceleration of the pusher plate 110 to a target speed followed by sudden and rapid deceleration of the pusher plate 110 may cause the first mass 140 and the second mass 150 to release from the pusher plate 110. The first mass 140 and the second mass 150 may each freely travel along a ballistic pathway (e.g., first ballistic pathway 164 and second ballistic pathway 166, respectively) to contact the vehicle airbag 172. The device 100 may include any of the features of the device described herein. Additionally, the pusher plate 110, first pin 130, second pin 132, first magnets 134, second magnets 136, first mass 140, second mass 150, and vehicle airbag deployment device 170 may have any of the features described herein.

The devices 100, systems, and methods of the present disclosure may enable component testing of vehicle airbags 172 that produces test data that more closely models test data from full vehicle collision testing compared to other conventional airbag component testers. Referring to FIG. 12, test data for vehicle airbag component testing using the device 100 of the present disclosure that includes the impact force on the head portion of the first mass 140 as a function of time is provided and identified by reference number 906. The data for vehicle airbag component testing using device 100 was obtained using the device 100 disclosed herein operated under conditions that produce a total energy into the vehicle airbag 172 equal to the total energy into the vehicle airbag measured in the full vehicle collision test (data series 902). In other words, the total energy into the vehicle airbag 172 was maintained constant (total energy included the energy from contact of both the first mass 140 and second mass 150 with the vehicle airbag 172). As shown in FIG. 12, the results obtained by using the device 100 (data series 906) correlates well with the test data obtained from a full vehicle collision test 902 with respect to the maximum force and the force profile. In particular, the test data 906 obtained using the device 100 of the present disclosure shows that the forces measured for the first mass 140 are comparable to the forces on the head portion measured during the full vehicle collision test (902). The maximum force measured for the first mass 140 of the device 100 during the component test was less than 2500 N, which is comparable to the maximum force on the head portion measured for the full vehicle collision test (902) and substantially less than the maximum force measured for the conventional airbag component tester (904). Additionally, the force profile for the testing using device 100 (data series 906) shows the force on the first mass 140 steadily increasing from about 100 ms to about 300 ms, which mirrors the force profile obtained from the full vehicle collision test 902. Thus, FIG. 12 demonstrates that the devices 100, systems, and methods of the present disclosure may provide data on the impact forces experienced by the first mass 140 that more closely model the results obtained for forces acting on the head portion of the AF05 dummy during a full vehicle collision test when compared to the results obtained from a conventional airbag component tester.

The devices 100, systems, and methods disclosed herein may additionally reduce the cost of testing properly tuning vehicle airbags 172 by reducing the number of full vehicle collision tests, which require the use of full vehicles. The devices 100 disclosed herein may also enable modification of the positioning of the first mass 140 and the second mass 150 independent of one another and modification of the speed and timing of release of the first mass 140 and second mass 150, which may enable fine tuning of the geometry, placement, trajectory, timing, pressure, or other parameter of the vehicle airbag module 177. Other benefits may also be realized by the devices 100, systems, and method of the present disclosure, though not explicitly identified and described herein.

Figure 2:
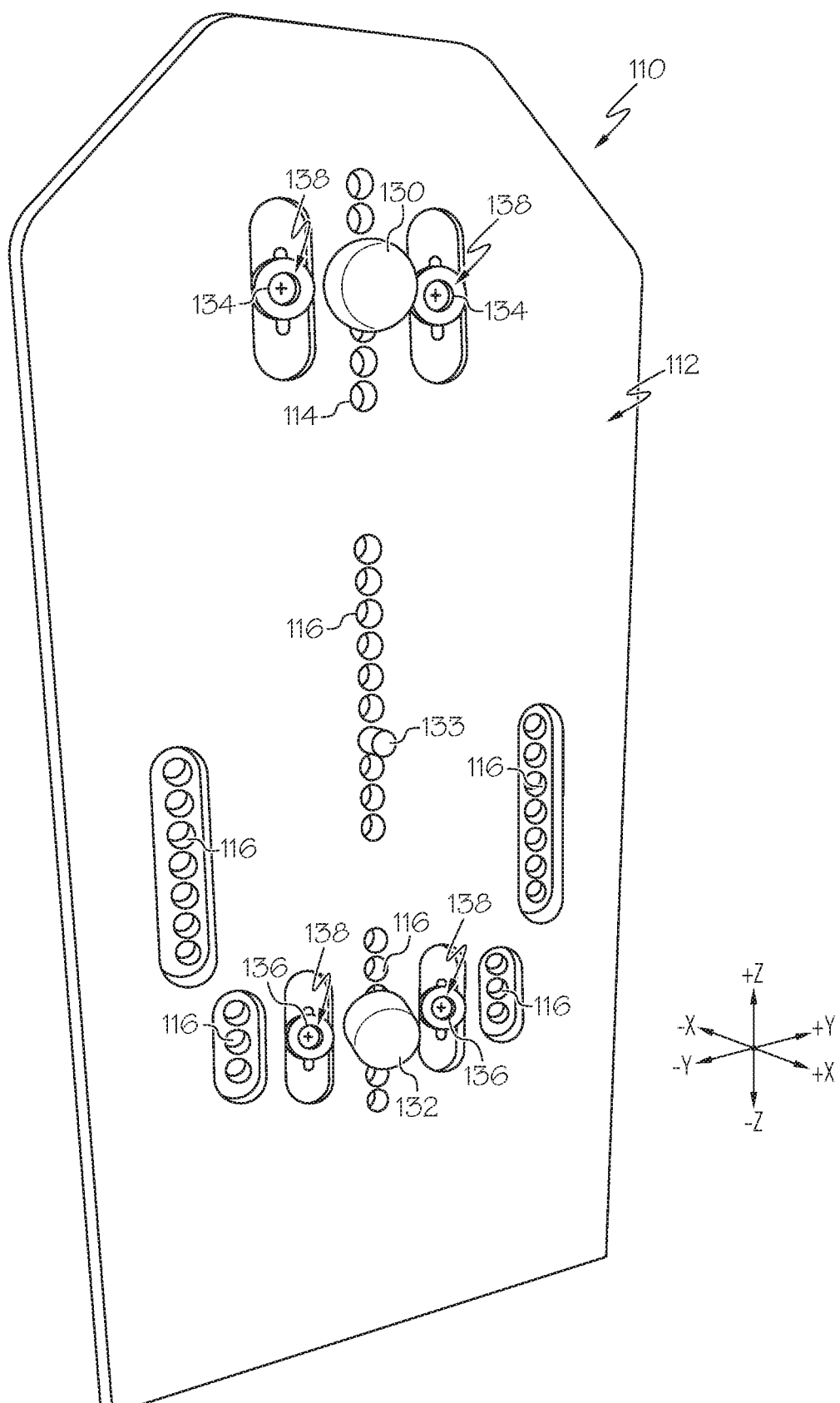
FIG. 2 schematically depicts a perspective view of a pusher plate of the device of FIG. 1 for testing a vehicle airbag, the pusher plate including a first pin, a second pin, first magnets, and second magnets, according to one or more embodiments shown and described herein.
Figure 3:
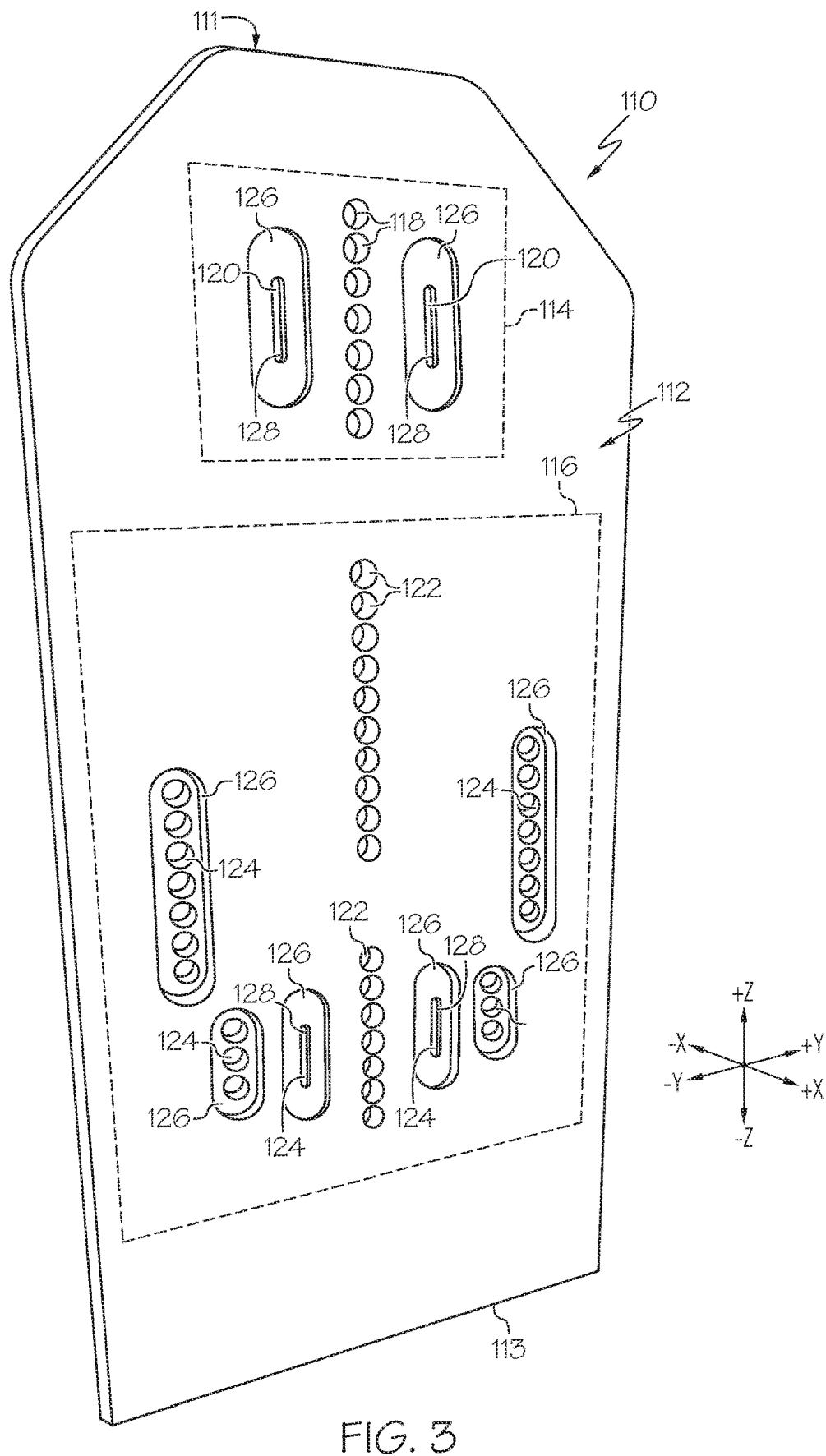
FIG. 3 schematically depicts a perspective view of the pusher plate of FIG. 2 with the first pin, second pin, first magnets, and second magnets removed from the pusher plate, according to one or more embodiments shown and described herein.

Referring to FIGS. 2-3, the pusher plate 110 may include a flat plate having a front surface 112 oriented in a direction facing towards the vehicle airbag deployment device 170 (e.g., in the +X direction of the coordinate axis in FIGS. 1-3). The pusher plate 110 may be constructed from a non-magnetic metal so that the pusher plate 110 does not become magnetized through continued contact between the pusher plate 110 and the first magnets 134 and second magnets 136. Non-magnetic metals may include, but are not limited to, aluminum, copper, lead, tin, titanium, zinc, alloys of these metals, or combinations thereof. Magnetization of the pusher plate 110 may cause additional pulling forces against the first mass 140 and second mass 150 during testing, which may introduce errors into the testing or require adjustment of one or more of the speed, position, or angle of the accelerator 160. The pusher plate 110 may also be a lightweight metal, such as a metal having a density less than 5000 kilograms per cubic meter ($kg/m^3$), to reduce the load on the accelerator 160. Reducing the load on the accelerator 160 may enable the accelerator 160 to achieve greater target speeds during acceleration of the pusher plate 110 or enable use of a smaller, less powerful accelerator 160. Examples of lightweight metals may include, but are not limited to, aluminum, platinum, alloys of these, or combinations thereof. In some embodiments, the pusher plate 110 may include aluminum, aluminum alloy, titanium, titanium alloy, or combinations of these.

Referring to FIG. 3, as previously discussed, the pusher plate 110 may include the plurality of first mounting holes 114 and the plurality of second mounting holes 116. The first mounting holes 114 may extend through a thickness of the pusher plate 110 and may be arranged on the pusher plate 110. The first mounting holes 114 may be positioned in an upper portion, which is the portion of the pusher plate 110 proximate the top 111 of the pusher plate 110. The first mounting holes 114 may be positioned above (i.e., in the +Z direction of the coordinate axis of FIG. 3) the plurality of second mounting holes 116. The first mounting holes 114 may be distributed vertically (i.e., in the +/−Z direction of the coordinate axis of FIG. 3), horizontally (i.e., in the +/−Y direction of the coordinate axis of FIG. 3), or both on the pusher plate 110. For example, the first mounting holes 114 may be distributed vertically on the pusher plate 110 to enable the height $H_1$ (FIG. 1) of the first mass 140 (i.e., position of the first mass 140 in the +/−Z direction) to be modified. Additionally or alternatively, the first mounting holes 114 may be distributed horizontally on the pusher plate 110 to enable the horizontal position of the first mass 140 (i.e., position of the first mass 140 in the +/−Y direction) to be modified.

The first mounting holes 114 may include a plurality of first pin mounting holes 118 and a plurality of first magnet mounting holes 120. The first pin mounting holes 118 may be distributed on the pusher plate 110 and may be configured to receive the first pin 130. The first magnet mounting holes 120 may be arranged proximate the first pin mounting holes 118 so that the first magnets 134 received in the first magnet mounting holes 120 can exert a pulling force on the first mass 140 when the first mass 140 is received on the first pin 130. The first magnet mounting holes 120 may include a plurality of cylindrical holes and/or a slot 128, which may allow for continuous adjustment of the position of the first magnets 134 along the slot 128. Although depicted in FIG. 3 as being vertical (i.e., in the +/−Z direction of the coordinate axis in FIG. 3), the slots 128 of the first magnet mounting holes 120 may also be horizontal (+/−Y direction) or angled (e.g., diagonal).

Referring again to FIG. 3, the second mounting holes 116 may extend through the thickness of the pusher plate 110 and may be arranged on the pusher plate 110. The second mounting holes 116 may be positioned in a lower portion, which is the portion of the pusher plate 110 proximate a bottom 113 of the pusher plate 110 relative to the first mounting holes 114. The second mounting holes 116 may be positioned below (i.e., in the −Z direction of the coordinate axis of FIG. 3) the plurality of first mounting holes 114. The second mounting holes may be distributed vertically (i.e., in the +/−Z direction of the coordinate axis of FIG. 3), horizontally (i.e., in the +/−Y direction of the coordinate axis of FIG. 3), or both on the pusher plate 110. For example, the plurality of second mounting holes 116 may be distributed vertically on the pusher plate 110 to enable the height $H_2$ (FIG. 1) of the second mass 150 (i.e., position of the second mass 150 in the +/−Z direction) to be modified. Additionally or alternatively, the second mounting holes 116 may be distributed horizontally on the pusher plate 110 to enable the horizontal position of the second mass 150 (i.e., position of the second mass 150 in the +/−Y direction) to be modified.

The second mounting holes 116 may include a plurality of second pin mounting holes 122 and a plurality of second magnet mounting holes 124. The second pin mounting holes 122 may be distributed on the pusher plate 110 and may be configured to receive the second pin 132. The second magnet mounting holes 124 may be arranged proximate the second pin mounting holes 122 so that the second magnets 136 received in the second magnet mounting holes 124 can exert a pulling force on the second mass 150 when the second mass 150 is received on the second pin 132. The second magnet mounting holes 124 may include a plurality of cylindrical holes and/or a slot 128, which may allow for continuous adjustment of the position of the second magnets 136 along the slot 128. Although depicted in FIG. 3 as being vertical (i.e., in the +/−Z direction of the coordinate axis in FIG. 3), the slots 128 of the second magnet mounting holes 124 may also be horizontal (+/−Y direction) or angled (e.g., diagonal).

Referring again to FIG. 3, the pusher plate 110 may include a plurality of recessed regions 126 distributed across the pusher plate 110. In the recessed regions 126, the front surface 112 of the pusher plate 110 may be recessed and the thickness of the pusher plate 110 may be decreased. One or more of the first mounting holes 114, one or more of the second mounting holes 116, or both may be positioned within one or a plurality of the recessed regions 126. In some embodiments, one or a plurality of the first mounting holes 114, such as the first magnet mounting holes 120, may be positioned in one or more of the recessed regions 126. Additionally, one or a plurality of the second mounting holes 116, such as second magnet mounting holes 124, may also be positioned in one or more of the recessed regions 126. Locating one or more of the first mounting holes 114, second mounting holes 116, or both in one or more of the recessed regions 126 may enable the first magnets 134, the second magnets 136, or both to be mounted to the pusher plate 110 with the outer surfaces 138 of the magnets (e.g., first magnets 134 and/or second magnets 136) aligned flush with the front surface 112 of the pusher plate 110. This may enable the first mass 140 and/or the second mass 150 to rest flush against the front surface 112 of the pusher plate 110 when received on the first pin 130 and second pin 132, respectively.

In some embodiments, the pusher plate 110 may include the plurality of recessed regions 126 surrounding at least a portion of the first mounting holes 114, the second mounting holes 116, or both. The at least one first magnet 134, the at least one second magnet 136, or both may be positioned in the portion of the first mounting holes 114, the second mounting holes 116, or both that are surrounded by the recessed regions 126 so that the outer surface 138 of the at least one first magnet 134, the at least one second magnet 136, or both is aligned flush with the front surface 112 of the pusher plate 110.

Figure 4:
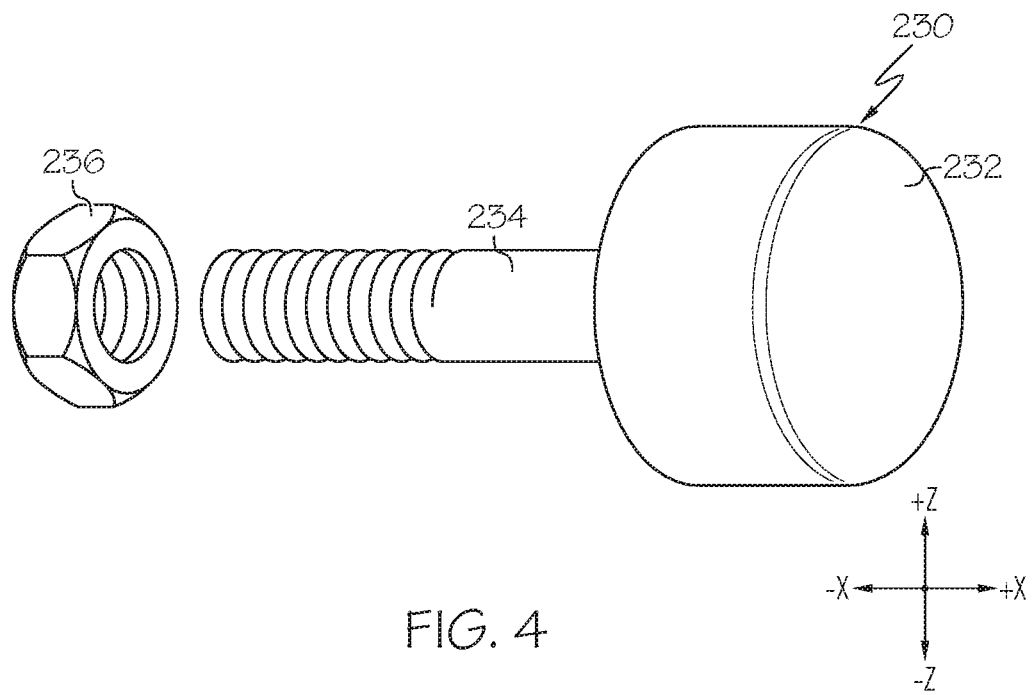
FIG. 4 schematically depicts a side perspective view of a pin that may be used for the first pin and/or the second pin depicted in FIG. 2, according to one or more embodiments shown and described herein.

Referring again to FIG. 2, the pusher plate 110 of the device 100 includes the first pin 130 engageable with one of the first mounting holes 114 and the second pin 132 engageable with one of the second mounting holes 116. Referring now to FIG. 4, an example of a pin 230 that may be suitable for the first pin 130 and/or the second pin 132 is schematically depicted. The pin 230 may include a pin head 232, a pin shaft 234, and a fastener 236. The pin head 232 may be configured/shaped to be inserted into a corresponding recess in the first mass 140 or second mass 150. The pin head 232 may have a shape that is cylindrical, hemispherical, irregular shape, or other shape. Cylindrical can refer to cylinders having cross-sections that are circular, elliptical, square, rectangular, polygonal, irregular-shaped, or other shaped. In some embodiments, the pin head 232 may be cylindrical having a circular cross-sectional shape, which may reduce or prevent the pin head 232 from influencing the trajectory of the first mass 140 and/or the second mass 150 when released from the pusher plate 110. In some embodiments, the end of the pin head 232 may be rounded or beveled. The pin 230 may be constructed of a material capable of supporting the weight of the first mass 140 or the second mass 150. The pin 230 may also include a material with a low coefficient of friction to reduce or eliminate the influence of frictional forces on release of the first mass 140 or second mass 150 from the pusher plate 110. In some embodiments, the pin head 232 of the pin 230 may be a hard plastic having a low coefficient of friction.

The pin shaft 234 may extend from the pin head 232 through the pusher plate 110 to the fastener 236, which may be attached to the pin shaft 234 protruding through the pusher plate 110. The fastener 236 may be any fastener capable of coupling the pin 230 to the pusher plate 110, such as but not limited to threaded fasteners, lock pins, snap rings, clamps, clips, other fasteners, or combinations of fasteners. In some embodiments, the fastener 236 may be operable to adjust a depth of the pin 230 relative to the pusher plate 110 (e.g., adjust the position of the pin head 232 in the +/−X direction of the coordinate axis in FIG. 4 relative to front surface 112 of the pusher plate 110). For example, the fastener 236 may be a threaded fastener threaded onto a threaded end of the pin shaft 234, which may enable the depth of the pin head 232 relative to the pusher plate 110 to be adjusted by tightening or loosening the threaded fastener. Although the fastener 236 is shown in FIG. 4 as being a threaded nut engageable with a threaded end of pin shaft 234, it is understood that the fastener 236 could include any fastener operable to couple the pin 230 to the pusher plate 110.

Referring again to FIG. 2, the first pin 130 may have any of the attributes described hereinabove for pin 230. The first pin 130 may be repositionable in any one of the plurality of first mounting holes 114 to change a position of the first mass 140 on the pusher plate 110. The first pin 130 may be removable from one first mounting hole 114 and positionable in another of the plurality of first mounting holes 114. The pin head of the first pin 130 may have a shape that is cylindrical or hemispherical in shape. Since the first mass 140 is generally rounded or circular in shape, selecting a cylindrical or hemispherical shape for the first pin 130 may reduce or prevent the shape of the first pin 130 from influencing the trajectory of the first mass 140 during release of the first mass 140 from the pusher plate 110.

The second pin 132 may have any of the attributes described hereinabove for pin 230. The second pin 132 may be repositionable in any one of the plurality of second mounting holes 116 to change a position of the second mass 150 on the pusher plate 110. The second pin 132 may be removable from one second mounting hole 116 and positionable in another of the plurality of second mounting holes 116. The pin head 232 (FIG. 4) of the second pin 132 may have any shape described herein for pin head 232. In some embodiments, the second pin 132 may have a shape or the pin head 232 that is cylindrical or hemispherical in shape. In other embodiments, the second pin 132 may have a pin head 232 having a cross-sectional shape that is polygonal, square, triangular, rectangular, irregular-shaped, or other shape. In some embodiments, the shape of the pin head 232 of the second pin 132 in conjunction with the shape of the recess on the second mass 150 may ensure proper rotational alignment of the second mass 150 on the pusher plate 110, as will be described subsequently herein.

Figure 5:
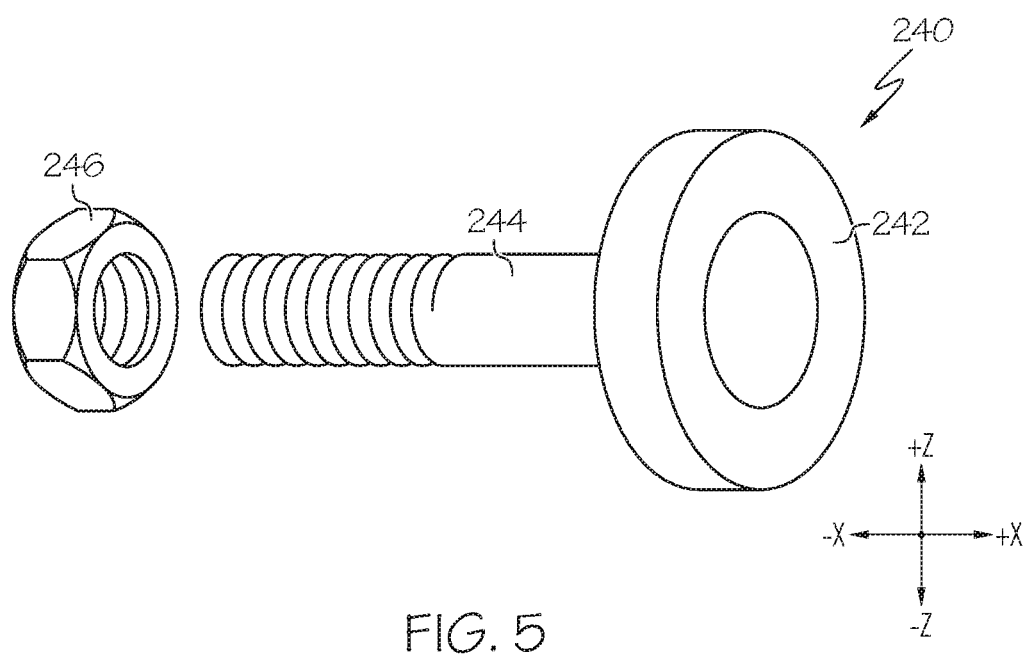
FIG. 5 schematically depicts a side perspective view of a magnet that may be used for the first magnets and/or the second magnets depicted in FIG. 2, according to one or more embodiments shown and described herein.

Referring again to FIG. 2, the pusher plate 110 also includes one or a plurality of the first magnets 134 engageable with one of the first mounting holes 114 and one or a plurality of the second magnets 136 engageable with one of the second mounting holes 116. Referring now to FIG. 5, an example of a magnet assembly 240 that may be suitable for the first magnets 134 and the second magnets 136 is schematically depicted. The magnet assembly 240 may include a magnet portion 242, a magnet shaft 244, and a magnet fastener 246. The magnet portion 242 may be a rare earth magnet having a pulling force. The magnet shaft 244 may extend from a surface of the magnet portion 242 and may be shaped and sized to be received in one of the first mounting holes 114 or second mounting holes 116 and extend all the way through the pusher plate 110. The magnet fastener 246 may have any of the attributes or characteristics previously described for fastener 236 (FIG. 4). The magnet fastener 246 may be operable to adjust a depth of the magnet portion 242 of the magnet assembly 240 relative to the pusher plate 110 (e.g., adjust the position of the magnet portion 242 in the +/−X direction of the coordinate axis in FIG. 5 relative to front surface 112 of the pusher plate 110). For example, the magnet fastener 246 may be a threaded fastener threaded onto a threaded end of the magnet shaft 244, which may enable the depth of the magnet portion 242 relative to the pusher plate 110 to be adjusted by tightening or loosening the threaded fastener.

Referring again to FIG. 2, one or a plurality of the first magnets 134 may be repositionable in any of the plurality of first mounting holes 114, and one or a plurality of the second magnets 136 may be repositionable in any of the plurality of second mounting holes 116. The first magnets 134 and the second magnets 136 may each include any or all of the attributes and characteristics previously described above for the magnet assembly 240 (FIG. 5). The first magnets 134 may be repositionable in some of the first mounting holes 114 at positions proximate the first pin 130 so that the first magnets 134 are operable to hold the first mass 140 against the pusher plate 110 when the first mass 140 is received on the first pin 130. The first magnets 134 may prevent the first mass 140 from sliding or cantilevering off of the first pin 130.

The total pulling force of the first magnets 134 is the sum of the pulling force exerted by each of the first magnets 134 on the first mass 140. The total pulling force of the one or a plurality of the first magnets 134 may be sufficient to hold the first mass 140 against the pusher plate 110 and prevent the first mass 140 from prematurely sliding off the first pin 130 or separating from the pusher plate 110 prior to release. The pulling force of the one or plurality of the first magnets 134 may be less than an amount of pulling force that results in a change in trajectory of the first mass 140 when released from the pusher plate 110 or that prevents the first mass 140 from achieving a desired free flight velocity after release from the pusher plate 110. The total pulling force of the first magnets 134 can be greater than or equal to 6 pounds of force ($lb_f$), greater than or equal to 10 $lb_f$, or even greater than or equal to 12 $lb_f$. The total pulling force of the first magnets 134 can be less than or equal to 20 $lb_f$, less than or equal to 18 $lb_f$, or less than or equal to 15 $lb_f$. In some embodiments, the total pulling force of the first magnets 134 may be from 6 $lb_f$ to 20 $lb_f$, from 6 $lb_f$ to 18 $lb_f$, from 6 $lb_f$ to 15 $lb_f$, from 10 $lb_f$ to 20 $lb_f$, from 10 $lb_f$ to 18 $lb_f$, from 10 $lb_f$ to 15 $lb_f$, from 12 $lb_f$ to 20 $lb_f$, from 12 $lb_f$ to 18 $lb_f$, or from 12 $lb_f$ to 15 $lb_f$. The target velocity of the accelerator 160 can be adjusted to balance the total pulling force of the first magnets 134 to release the first mass 140 at the target free flight velocity.

The second magnets 136 may be repositionable in some of the second mounting holes 116 at positions proximate the second pin 132 so that the second magnets 136 are operable to hold the second mass 150 against the pusher plate 110 when the second mass 150 is received on the second pin 132. The total pulling force of the second magnets 136 may be the sum of the pulling force exerted by each of the second magnets 136 on the second mass 150. The total pulling force of the one or plurality of the second magnets 136 may be sufficient to hold the second mass 150 against the pusher plate 110 and prevent the second mass 150 from prematurely sliding off the second pin 132 or separating from the pusher plate 110 prior to release. Without the second magnets 136, the second mass 150 may tend to slide or cantilever off of the second pin 132. The pulling force of the one or plurality of the second magnets 136 may be less than an amount of pulling force that results in a change in trajectory of the second mass 150 when released from the pusher plate 110 or that prevents the second mass 150 from achieving a desired free flight velocity after release from the pusher plate 110. The total pulling force of the second magnets 136 can be greater than or equal to 6 pounds of force ($lb_f$), greater than or equal to 10 $lb_f$, or even greater than or equal to 12 $lb_f$. The total pulling force of the second magnets 136 can be less than or equal to 20 $lb_f$, less than or equal to 18 $lb_f$, or less than or equal to 15 $lb_f$. In some embodiments, the total pulling force of the second magnets 136 may be from 6 $lb_f$ to 20 $lb_f$, from 6 $lb_f$ to 18 $lb_f$, from 6 $lb_f$ to 15 $lb_f$, from 10 $lb_f$ to 20 $lb_f$, from 10 $lb_f$ to 18 $lb_f$, from 10 $lb_f$ to 15 $lb_f$, from 12 $lb_f$ to 20 $lb_f$, from 12 $lb_f$ to 18 $lb_f$, or from 12 $lb_f$ to 15 $lb_f$. The target velocity of the accelerator 160 can be adjusted to balance the pulling force of the second magnets 136 to release the second mass 150 at a desired free flight velocity.

Figure 6:
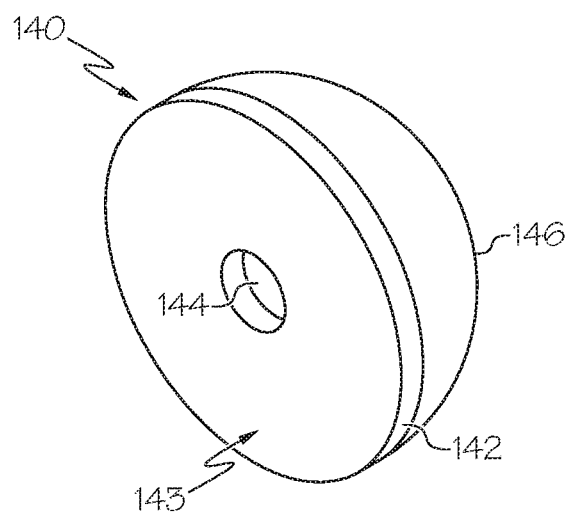
FIG. 6 schematically depicts a perspective view of a first mass of the device of FIG. 1, according to one or more embodiments shown and described herein.

Referring now to FIG. 6, the first mass 140 of device 100 may include a first metal plate 142 and a head form 146 coupled to the first metal plate 142. The first metal plate 142 may be made from a magnetic metal, such as a ferrous metal, that is attracted to the magnetic forces of the first magnets 134. As used herein, the term "magnetic metal" refers to a metal that is attracted by the magnetic field produced by a magnet. The term "magnet" is used for the material or apparatus that produces the magnetic field. The first metal plate 142 may be circular in shape and may have an outer surface 143 oriented towards the pusher plate 110. The first metal plate 142 may include a recess 144 extending inward from the outer surface 143. The recess 144 may be shaped to receive the first pin 130 when the first mass 140 is arranged on the pusher plate 110.

Figure 8:
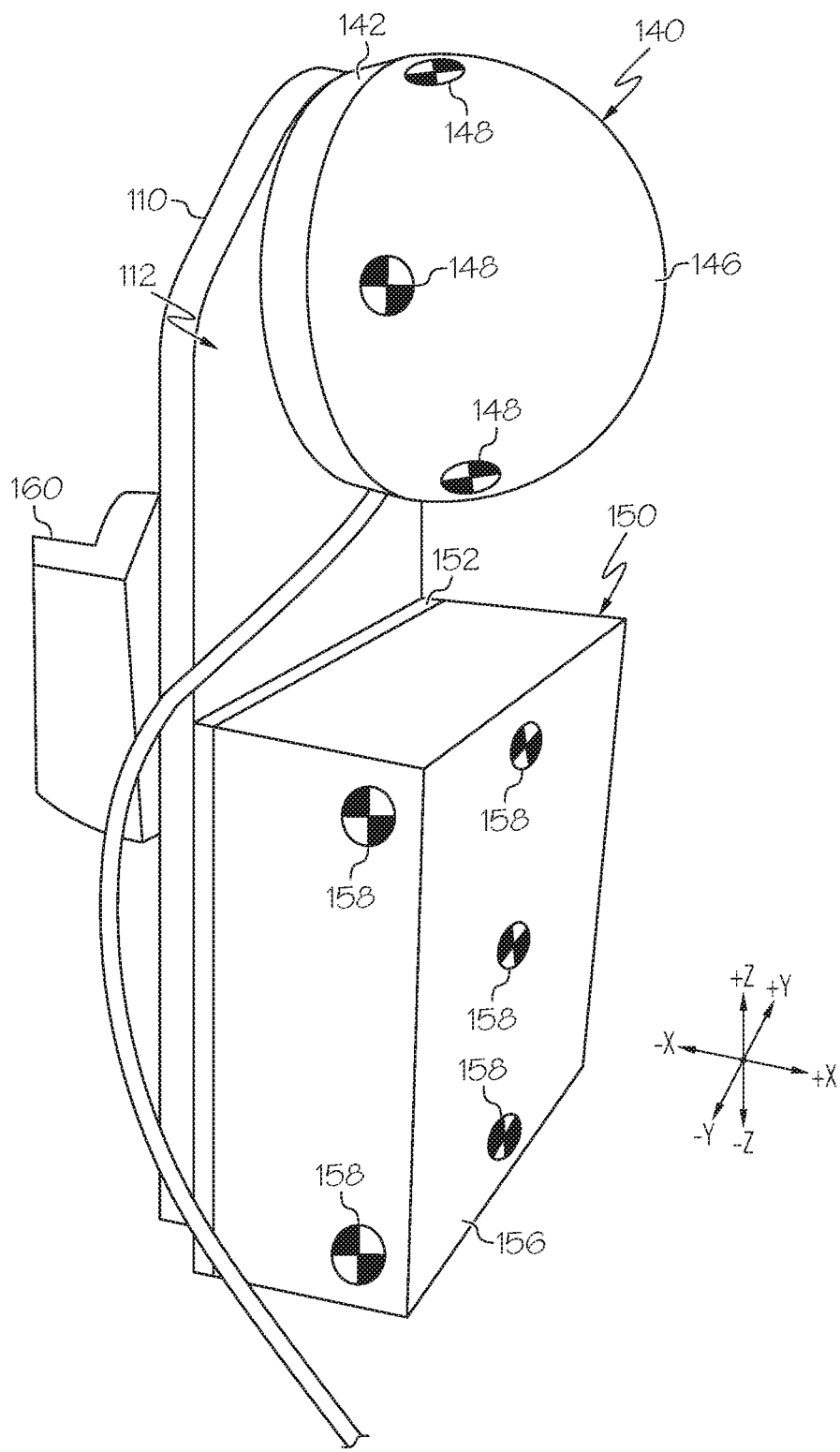
FIG. 8 schematically depicts a perspective view of the pusher plate of FIG. 2 having the first mass of FIG. 4 and the second mass of FIG. 5 positioned thereon, according to one or more embodiments shown and described herein.

The head form 146 may have a shape, size, and mass selected to model the shape, size, and mass of the human head. In some embodiments, the head form 146 may be generally semi-spherical or hemi-spherical in shape. As an alternative to the first metal plate 142, in some embodiments, the first mass 140 may include the head form 146 having an outer surface, a recess in the outer surface of the head form 146, and a plurality of metal regions on the outer surface of the head form 146, the metal regions positioned to interact with the first magnets 134 coupled to the pusher plate 110. Other configurations of the first mass 140 are contemplated. Referring not to FIG. 8, the first mass 140 may include a plurality of first sensors 148 distributed across the head form 146 of the first mass 140. The first sensors 148 may collect data on one or more variables of the first mass 140 (e.g., position, velocity, force, etc.) during performance of a vehicle airbag component test using the device 100.

Figure 9:
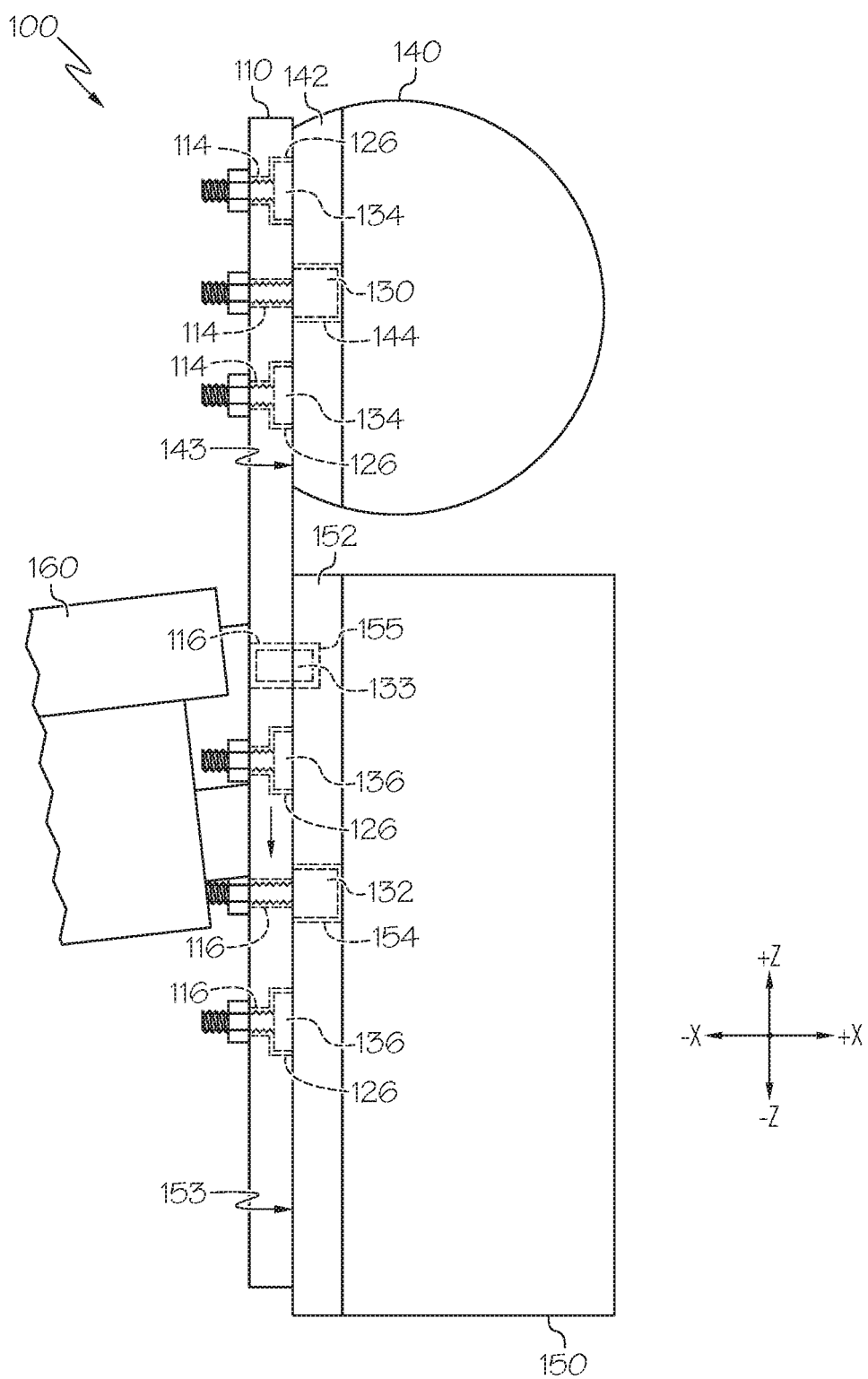
FIG. 9 schematically depicts a side view of the pusher plate of FIG. 6 having the first mass and the second mass positioned thereon, according to one or more embodiments shown and described herein.

Referring to FIGS. 8 and 9, the first mass 140 may be temporarily attached to the pusher plate 110 before and during acceleration of the pusher plate 110 and prior to release of the first mass 140. Referring to FIG. 9, when the first mass 140 is arranged on the pusher plate 110, the first pin 130 may be received in the recess 144 of the first metal plate 142. The first magnets 134 may exert a pulling force on the first metal plate 142 to maintain the outer surface 143 of the first metal plate 142 in contact with the front surface 112 of the pusher plate 110. The first mass 140 may be received on the first pin 130 and the at least one first magnet 134 may secure the first mass 140 to the pusher plate 110 when the first mass 140 is received on the first pin 130 prior to and during acceleration of the pusher plate 110.

Figure 7:
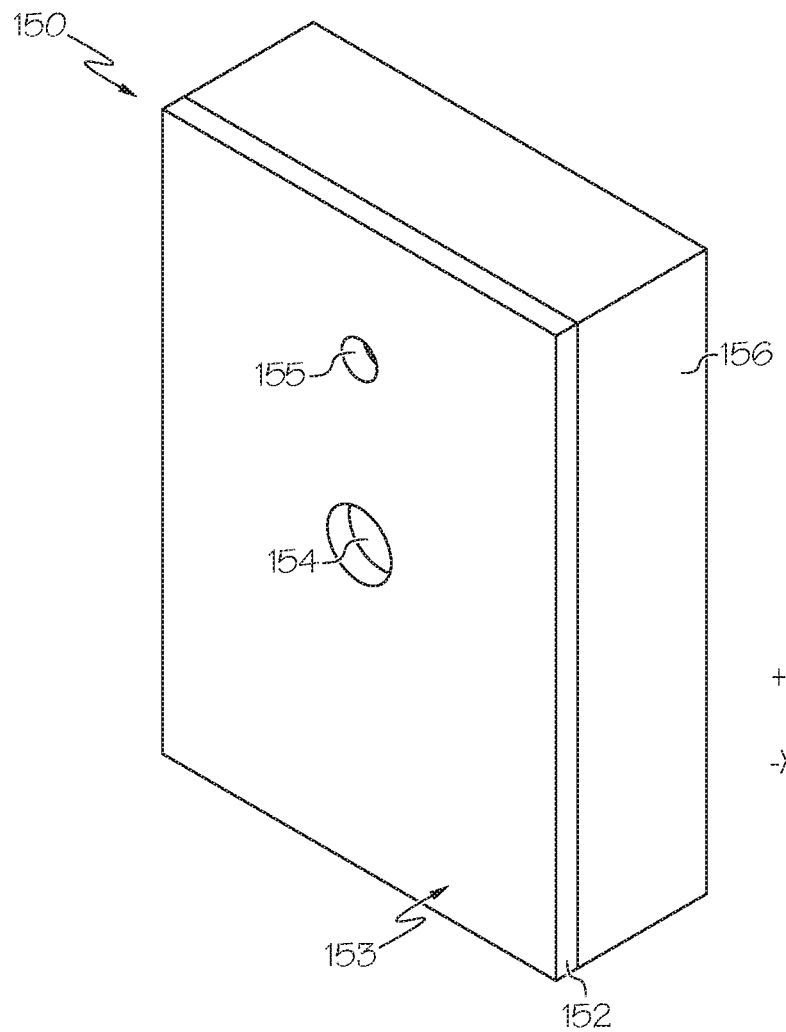
FIG. 7 schematically depicts a perspective view of a second mass of the device of FIG. 1 for testing a vehicle airbag, according to one or more embodiments shown and described herein.

Referring now to FIG. 7, the second mass 150 of device 100 may include a second metal plate 152 and a body block 156 coupled to the second metal plate 152. The second metal plate 152 may be made from a magnetic metal, such as a ferrous metal, that is attracted to the magnetic forces of the second magnets 136. The second metal plate 152 may have an outer surface 153 oriented towards the pusher plate 110. The second metal plate 152 may have a shape approximating the general shape of a human torso. For example, the second metal plate 152 may be rectangular in shape. Other suitable shapes for the second metal plate are contemplated, such as rectangular with rounded corners or other torso-like shapes. The second metal plate 152 may include a recess 154 extending inward from the outer surface 153. The recess 154 may be shaped to receive the second pin 132 when the second mass 150 is arranged on the pusher plate 110.

The second mass 150 may have a size, mass, or both that is greater than the size, mass, or both of the first mass 140. The body block 156 may have a shape, size, and mass selected to model the shape, size, and mass of a human torso. In some embodiments, the body block 156 may have a shape that is generally a rectangular prism. In some embodiments, the body block 156 may have an anthropomorphic shape that more closely resembles the shape of a human torso. As an alternative to the second metal plate 152, in some embodiments, the second mass 150 may include the body block 156 having an outer surface, a recess in the outer surface of the body block 156, and a plurality of metal regions on the outer surface of the body block 156, the plurality of metal regions positioned to interact with or contact the second magnets 136 coupled to the pusher plate 110. Other shapes and configurations of the second mass 150 are contemplated. Referring now to FIG. 8, the second mass 150 may include a plurality of second sensors 158 distributed across the body block 156 of the second mass 150. The second sensors 158 may collect data on one or more variables of the second mass 150 (e.g., position, velocity, force, etc.) during performance of a vehicle airbag component test using device 100.

Referring to FIGS. 8 and 9, the second mass 150 may be temporarily attached to the pusher plate 110 before and during acceleration of the pusher plate 110 and prior to release of the second mass 150 from the pusher plate 110. Referring to FIG. 9, when the second mass 150 is arranged on the pusher plate 110, the second pin 132 may be received in the recess 154 of the second metal plate 152. The second magnets 136 may exert a pulling force on the second metal plate 152 to maintain the outer surface 153 of the second metal plate 152 in contact with the front surface 112 of the pusher plate 110. In other words, the second mass 150 may be received on the second pin 132 and the at least one second magnet 136 may secure the second mass 150 to the pusher plate 110 when the second mass 150 is received on the second pin 132 prior to and during acceleration of the pusher plate 110.

Referring again to FIG. 2, when the second pin 132 is circular in geometry, the second mass 150, which may be rectangular in shape, may rotate on the second pin 132 relative the pusher plate 110. To prevent this rotation, the pusher plate 110 may optionally include a third pin 133 received in one of the plurality of second mounting holes 116 of the pusher plate 110. Referring to FIG. 7, the second mass 150 may have a locator recess 155 spaced apart from the recess 154 and positioned and shaped to receive the third pin 133. The third pin 133 of the pusher plate 110 and the locator recess 155 of the second mass 150 may cooperate to rotationally position the second mass 150 with respect to the pusher plate 110 and prevent rotation of the second mass 150 relative to the pusher plate 110 during acceleration and release of the second mass 150. Additionally or alternatively, the second pin 132 and the recess 154 in the second mass 150 may have complementary non-circular cross-sectional shapes that may be operable to prevent rotation of the second mass 150 relative to the pusher plate 110. Examples of complementary non-circular cross-sectional shapes may include square, rectangular, polygonal cross-section shapes, or other cross-sectional shapes capable of preventing rotation of the second mass 150 relative to the pusher plate 110.

Referring to FIGS. 8 and 9, the size and shape of the second mass 150 may be larger than the size and shape of the first mass 140, which may result in the surface area of the second mass 150 in a direction of acceleration being greater than a surface area of the first mass 140 in the direction of acceleration. During free flight of the first mass 140 and second mass 150, the larger surface area of the second mass 150 may result in the second mass 150 experiencing a greater amount of wind drag compared to the first mass 140. This may slow the velocity of the second mass 150 relative to the first mass 140, which may cause the first mass 140 to contact the vehicle airbag 172 before the second mass 150. If the first mass 140 and the second mass 150 are positioned on the pusher plate 110 so that they are vertically aligned (e.g., aligned in the +/−Z direction of the coordinate axis of FIGS. 8 and 9 so that the distance between the first mass 140 and the vehicle airbag deployment device 170 is equal to the distance between the second mass 150 and the vehicle airbag deployment device 170), the first mass 140 will reach the vehicle airbag 172 before the second mass 150 due to the difference in wind drag. The difference in time between impact of the first mass 140 with the vehicle airbag 172 and impact of the second mass 150 with the vehicle airbag 172 may be measured in as little as a few milliseconds, but may still effect the results of the component testing.

Figure 10B:
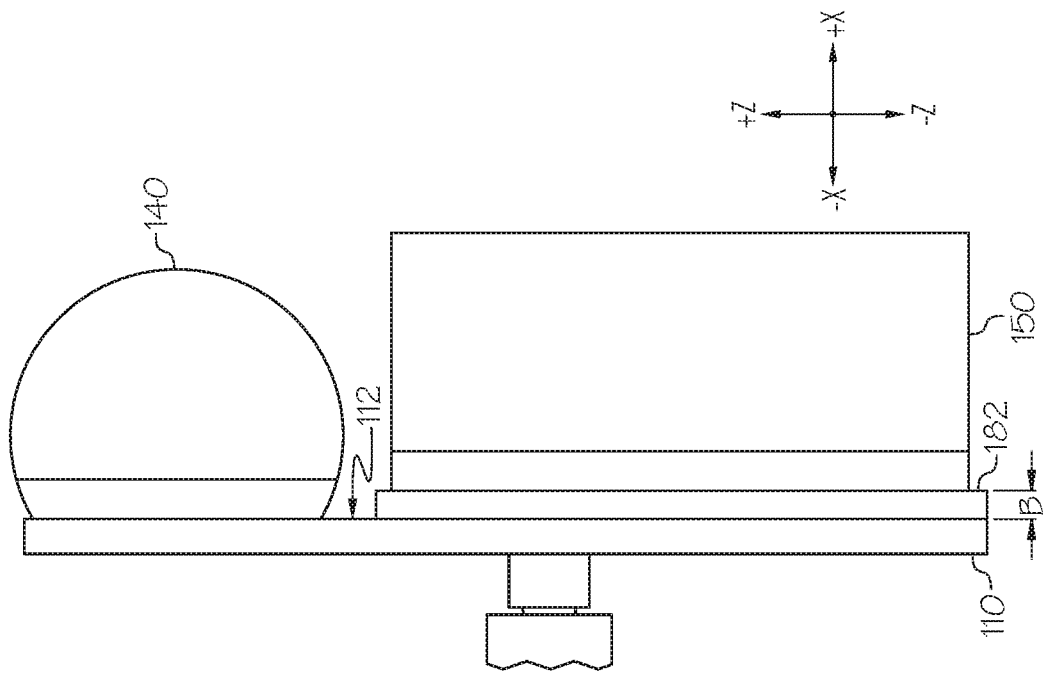
FIG. 10B schematically depicts a side view of the pusher plate of FIG. 10A in which a first mass and second mass are positioned on the pusher plate and spacer plate, respectively, according to one or more embodiments shown and described herein.
Figure 10A:
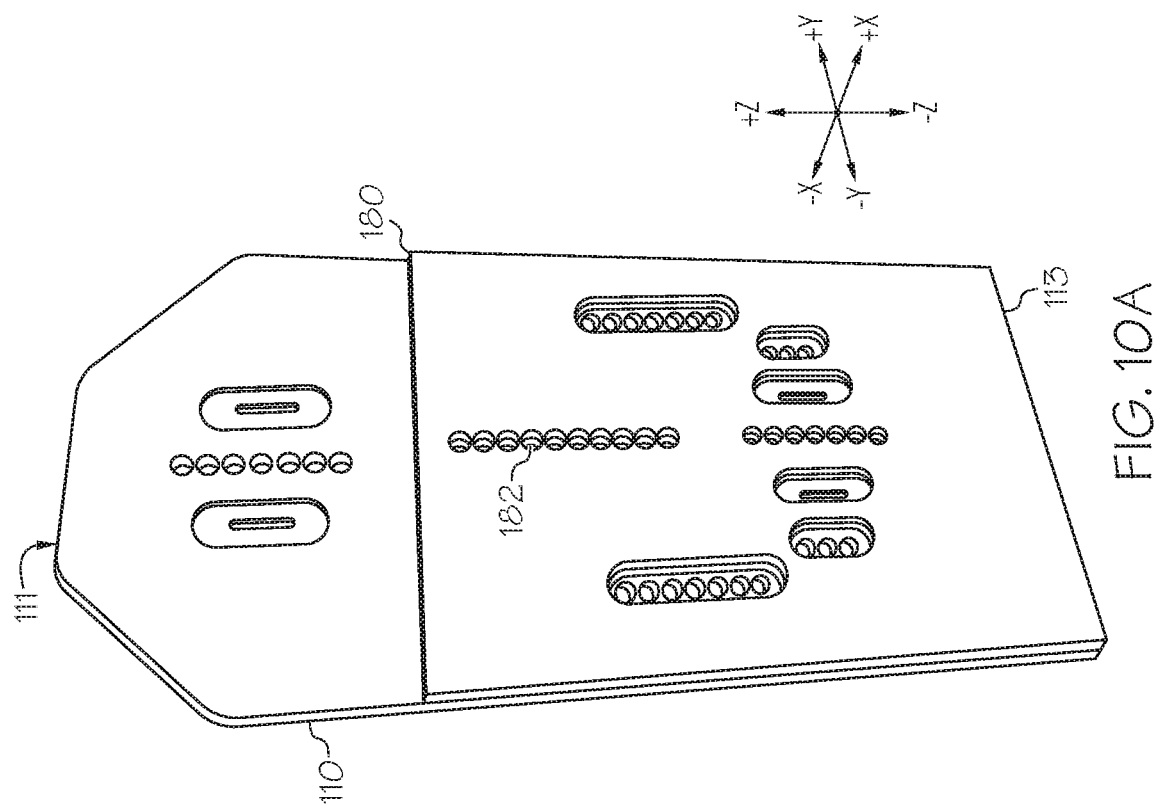
FIG. 10A schematically depicts a front perspective view of the pusher plate of FIG. 3 having a spacer plate coupled to a lower portion of the pusher plate, according to one or more embodiments shown and described herein.

Referring now to FIGS. 10A and 10B, to adjust for the effects of wind drag on the second mass 150, the pusher plate 110 may include a spacer plate 180, which may be coupled to the pusher plate 110 proximate the bottom 113 of the pusher plate 110. Referring to FIG. 10B, the spacer plate 180 may be disposed between the pusher plate 110 and the second mass 150. Referring to FIG. 10A, the spacer plate 180 may include one or a plurality of holes 182 to allow access to the second mounting holes 116 of the pusher plate 110 for installing the second pin 132, second magnets 136, and optionally the third pin 133. The second pin 132 and the second magnets 136 may be adjustable with respect to depth (i.e., distance in the +/−X direction of the coordinate axis in FIGS. 10A and 10B) to account for the combined thicknesses of the pusher plate 110 and the spacer plate 180. The spacer plate 180 may be coupled to the pusher plate 110 with an adjustable spacer plate fastener (not shown) that may be operable to adjust a distance of the spacer plate 180 from the pusher plate 110. The adjustable spacer plate fastener may include a screw mechanism that enables continuous adjustment of the spacer plate 180 in the +/−X direction relative to the pusher plate 110. Thus, the X position of the second mass 150 can be adjusted relative to the X position of the first mass 140.

Referring to FIG. 10B, the spacer plate 180 may be operable to position the second mass 150 closer to the vehicle airbag deployment device 170 relative to the first mass 140 (e.g., closer to the vehicle airbag deployment device 170 in the +X direction of the coordinate axis of FIG. 10B). The spacer plate 180 may cause the second mass 150 to be spaced apart from the front surface 112 of the pusher plate 110 by a distance B in the +X direction of the coordinate axis in FIG. 10B. The distance B is the distance in the +/−X direction between the front surface 112 of the pusher plate 110 and the outer surface 153 of the second mass 150. The distance B may be increased or decreased by changing a thickness of the spacer plate 180 or by increasing or decreasing a spacing between the spacer plate 180 and the pusher plate 110 using the adjustable spacer plate fastener previously discussed herein.

Positioning the second mass 150 closer to the vehicle airbag deployment device 170 relative to the first mass 140 may account for the difference in wind drag and may enable the first mass 140 and second mass 150 to contact the vehicle airbag 172 at the same time during the vehicle airbag testing. Additionally, modifying the relative vertical alignment of the second mass 150 relative to the first mass 140 using the spacer plate 180 may enable study of the effects of contacting either the first mass 140 or the second mass 150 with the vehicle airbag 172 before the other.

Referring to FIG. 1, the device 100 includes an accelerator 160 coupled to the pusher plate 110. The accelerator 160 may be operable to accelerate the pusher plate 110 to a target velocity and then rapidly decelerate the pusher plate 110. As used herein, the term "target velocity" refers to the maximum velocity of the pusher plate 110, the first mass 140, and the second mass 150 during acceleration of the pusher plate 110 and before deceleration of the pusher plate 110. The target velocity of the accelerator 160 may be sufficient to model the conditions of a full vehicle collision test conducted at vehicle speeds in a range of 25 miles per hour to 35 miles per hour. The target velocity may be in a range of from 3 meters per second (m/s) to 11 m/s, such as from 3 m/s to 9 m/s, from 5 m/s to 11 m/s, or from 5 m/s to 9 m/s. At target velocity less than about 3 m/s, the first mass 140 and second mass 150 may not have enough velocity to reach the vehicle airbag 172 in free flight.

Once the accelerator 160 reaches the target velocity, the accelerator 160 may be operable to decelerate the pusher plate 110 at a deceleration rate sufficient to release the first mass 140 and the second mass 150 from the pusher plate 110. The deceleration rate of the accelerator 160 may be rapid enough so that the momentum force of the first mass 140 and the second mass 150 in a direction away from the pusher plate 110 is greater than the pulling forces of the first magnets 134 and the second magnets 136 on the first mass 140 and the second mass 150, respectively, which results in the first mass 140 and second mass 150 releasing from the front surface 112 of the pusher plate 110. Thus, deceleration of the pusher plate 110 by the accelerator 160 causes the first mass 140 and the second mass 150 to release from the pusher plate 110. In some embodiments, the accelerator 160 may be operable to decelerate the pusher plate 110 at a deceleration rate having an absolute value of greater than or equal to 100 meters per second squared (m/s$^2$), greater than or equal to 200 m/s$^2$, greater than or equal to 500 m/s$^2$, or even greater than or equal to 1000 m/s$^2$.

The accelerator 160 may be any device capable of accelerating the pusher plate 110 and then rapidly decelerating the pusher plate 110 to cause the first mass 140 and second mass 150 to release. The accelerator 160 may include a piston, such as a hydraulic piston or pneumatic piston. Other types of accelerators may also be suitable for accelerating and decelerating the pusher plate.

Referring again to FIG. 1, the accelerator 160 may be angled slightly upward toward the vehicle airbag 172 so that the velocity vector of the first mass 140 and second mass 150 released from the pusher plate 110 is slightly elevated (i.e., the velocity vector has a nonzero component in the +Z direction of the coordinate axis) to compensate for the force of gravity, which tends to pull the first mass 140 and the second mass 150 towards the earth (i.e., in the −Z direction of the coordinate axis of FIG. 2). The accelerator 160 may be angled so that an angle α defined between a centerline C of the accelerator 160 and vertical plane P is less than 90 degrees, such as from 45 degrees to less than 90 degrees, from 60 degrees to less than 90 degrees, from 70 degrees to less than 90 degrees, or from 80 degrees to less than 90 degrees. The accelerator 160 may be spaced apart from the vehicle airbag deployment device 170 so that the front surface 112 of the pusher plate 110 is spaced apart from the vehicle airbag deployment device 170 by a distance D at the launch point of the first mass 140 and second mass 150. The "launch point" refers to the position of the pusher plate 110 at the point where the first mass 140 and the second mass 150 release from the pusher plate. The accelerator 160 may be moveable in the +/−X direction of the coordinate axis of FIG. 1 to increase or decrease the distance D between the pusher plate 110 at the launch point and the vehicle airbag deployment device 170. To compensate for the change in the distance D, the accelerator 160 may also be adjustable to change the angle α of the accelerator relative to the vertical plane P. For example, when the position of the accelerator 160 is modified to increase distance D, the angle α may be decreased, which may increase the magnitude of the +Z component of the velocity vector of the first mass 140 and second mass 150 released from the pusher plate 110. The target speed of the accelerator 160 may also be adjusted to compensate for the change in distance D.

The pusher plate 110 may be coupled to the accelerator 160 so that the front surface 112 of the pusher plate 110 is vertical (i.e., parallel with vertical plane P). This enables the device 100 to maintain a consistent vertical relationship of the first mass 140 to the second mass 150. The pusher plate 110 may be coupled to the accelerator 160 at a pivot point that may enable the pusher plate 110 to be rotatably adjusted relative to the accelerator 160. Rotational adjustment of the pusher plate 110 relative to the accelerator 160 may enable the angle α of the accelerator 160 to be increased or decreased while maintaining the pusher plate 110 in a vertical orientation (i.e., with the front surface 112 parallel to vertical plane P). In some embodiments, the pusher plate 110 can be rotated relative to the centerline C of the accelerator 160 so that the pusher plate 110 is non-vertical (i.e., not parallel to vertical plane P), which may enable the device 100 to be used to investigate or study the effects of the angle of the pusher plate 110 on the performance of the vehicle airbag 172.

Referring again to FIG. 1, the device 100 for testing a vehicle airbag 172 may include the vehicle airbag deployment device 170 spaced apart from the pusher plate 110 in the +X direction of the coordinate axis of FIG. 1. The vehicle airbag deployment device 170 may be operable to deploy the vehicle airbag 172 in the ballistic pathways of the first mass 140 and the second mass 150 (e.g., first ballistic pathway 164 and second ballistic pathway 166) after release of the first mass 140 and the second mass 150 from the pusher plate 110. The vehicle airbag deployment device 170 may include the vehicle airbag 172 and a front passenger compartment assembly 174.

The front passenger compartment assembly 174 may have a geometry that models the front interior portion of a full vehicle. The front passenger compartment assembly 174 may include a windshield portion 176 extending at an angle upward (i.e., +Z direction of the coordinate axis of FIG. 1) and towards the pusher plate 110 (i.e., in the −X direction of the coordinate axis of FIG. 1). The windshield portion 176 may provide a rigid boundary to deployment of the vehicle airbag 172. The front passenger compartment assembly 174 may include various features associated with the front interior portion of the full vehicle, such features may include, but are not limited to, one or more of a dashboard, driver console, steering column, steering wheel, center console, door panels, or other structures present in a front interior portion of vehicles. In some embodiments, the front passenger compartment assembly 174 may include the portion of a full vehicle from the B-pillar to the firewall. The "firewall" refers to a plane of demarcation between the engine compartment of the full vehicle from the passenger compartment, whether or not the firewall is embodied in a physical wall, such as a metal barrier. The B-pillar of the full vehicle refers to the pillars proximate the back of the driver's seat and extending from the chassis to the roof. In some embodiments the front passenger compartment assembly 174 may include a front half of a full vehicle which has been separated in half at the B-pillar. The front passenger compartment assembly 174 may remain stationary relative to the pusher plate 110, first mass 140, and second mass 150.

The vehicle airbag deployment device 170 may include a vehicle airbag module 177 installed in the front passenger compartment assembly 174. The vehicle airbag module 177 may include the vehicle airbag 172 and an inflator 178. The inflator 178 may be any inflator operable to inject a gas into the vehicle airbag 172 to inflate the vehicle airbag 172 from a deflated state to an inflated state. The inflator 178 may be operatively coupled to a vehicle airbag controller 179, switch, or other control device for controlling deployment of the vehicle airbag 172.

Referring again to FIG. 1, operation of the device 100 to conduct a vehicle airbag component test will now be described. The first mass 140 and the second mass 150 are positioned on the pusher plate 110. The accelerator 160 may be operated to accelerate the pusher plate 110 to the target velocity and then rapidly decelerate the pusher plate 110, which may cause the first mass 140 and the second mass 150 to release from the pusher plate 110. Upon release from the pusher plate 110, the first mass 140 and second mass 150 may travel in free flight along the first ballistic pathway 164 and the second ballistic pathway 166, respectively, towards the vehicle airbag deployment device 170. The vehicle airbag module 177 of the vehicle airbag deployment device 170 may deploy the vehicle airbag 172 in the ballistic pathways of the first mass 140 and second mass 150. The first mass 140 and second mass 150 may then contact the vehicle airbag 172. During contact of the first mass 140 and the second mass 150 with the vehicle airbag 172, the first sensors 148, the second sensors 158, or both may record one or more variables of the first mass 140, the second mass 150, or both. Variables may include the position, speed, acceleration/deceleration, force, or other parameter of the first mass 140 and the second mass 150.

The vehicle airbag module 177 and deployment of the vehicle airbag 172 may be fine-tuned by changing one or more parameters of the device 100. Fine-tuning the vehicle airbag 172 may include modifying one or more of the height $H_1$ of the first mass 140, height $H_2$ of the second mass 150, depth of the second mass 150 relative to the first mass 140, horizontal position (i.e., in +/−Y direction of the coordinate axis) of the first mass 140 and/or the second mass 150, the shape and/or mass of the first mass 140, the shape and/or mass of the second mass 150, distance D from the launch point to the vehicle airbag deployment device 170, angle α of the accelerator 160, angle of the pusher plate 110, target speed, timing of deployment of the vehicle airbag, or other parameter of the device 100. For example, the height $H_1$ of first mass 140, the height $H_2$ of the second mass 150, and/or spacing between the first mass 140 and the second mass 150 in the vertical direction (i.e., +/−Z direction of the coordinate axis) may be increased or decreased to fine-tune the geometry of the vehicle airbag 172 with respect to the physical dimensions of the vehicle occupant or positioning of the vehicle occupant in the vehicle. The horizontal position (i.e., position in the +/−Y direction of the coordinate axis in the Figures) of the first mass 140, the second mass 150, or both may also be modified to further fine-tune the geometry of the vehicle airbag 172.

As previously discussed, the depth of the first mass 140, the depth of the second mass 150, or both can be modified to so that the first mass 140 and the second mass 150 contact the vehicle airbag 172 at generally the same time. Alternatively, the depths of the first mass 140 and the second mass 150 can be modified to cause either the first mass 140 or the second mass 150 to contact the vehicle airbag 172 first. In some embodiments, the shape and/or mass of the first mass 140 and/or the shape and mass of the second mass 150 may be modified to fine-tune the geometry of the vehicle airbag 172. The shape and mass of the first mass 140 may be modified by substituting a third mass for the first mass 140, the third mass having a shape and/or mass different than the first mass 140. The third mass may include any of the other characteristics previously described herein for the first mass 140. Similarly, the shape and/or mass of the second mass 150 may be modified by substituting a fourth mass for the second mass 150, the fourth mass having a shape and/or mass different than the second mass 150. As an example, the first mass 140 and second mass 150 may be replaced by the third mass and fourth mass, each of lesser mass than the first mass 140 and second mass 150, respectively, to fine-tune deployment and geometry of the vehicle airbag 172 for a human being with a smaller body and head size. Likewise, the third mass and fourth mass can have masses greater than the first mass 140 and second mass 150, respectively, to fine-tune the vehicle airbag 172 for a larger human being.

As previously discussed, the distance D between the pusher plate 110 at the launch point and the vehicle airbag deployment device 170 can also be increased or decreased, with corresponding modifications to the angle α of the accelerator 160 and/or to the target speed of the pusher plate 110. The target speed may be increased or decreased to increase or decrease a speed of the first mass 140 and second mass 150 in free flight, which may increase or decrease the force of contact of the first mass 140 and second mass 150 with the vehicle airbag 172. The timing of deployment of the vehicle airbag 172 relative to release of the first mass 140 and second mass 150 from the pusher plate 110 may also be increased or decreased to fine-tune timing of the deployment of the vehicle airbag 172.

Figure 11:
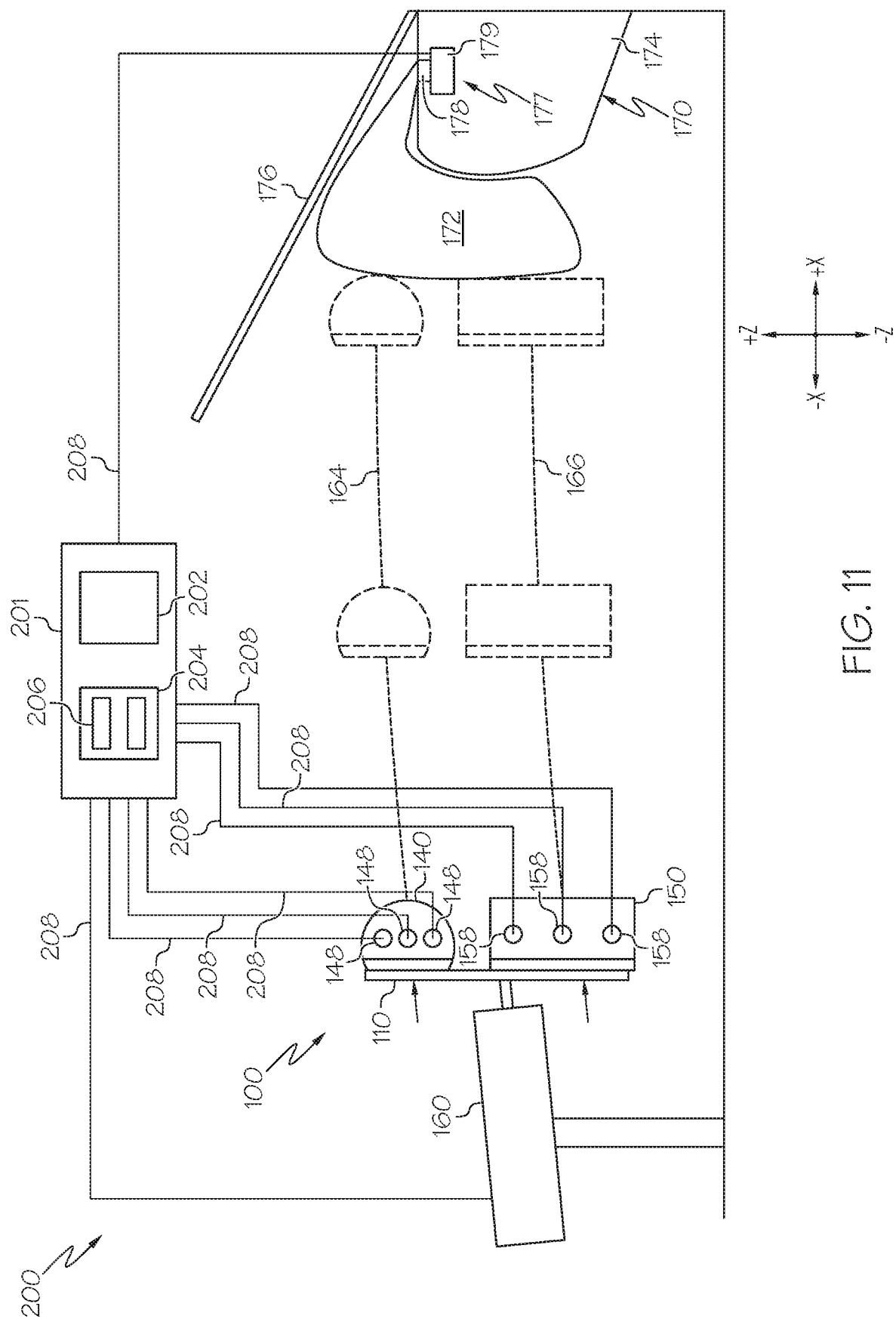
FIG. 11 schematically depicts a system for testing vehicle airbags that includes the device of FIG. 1, according to one or more embodiments shown and described herein.

Referring now to FIG. 11, a system 200 for testing a vehicle airbag 172 that includes the device 100 is schematically depicted. The system 200 includes the device 100, which can have any of the features and characteristics previously described herein for device 100. The system 200 may further include the vehicle airbag deployment device 170 and a control system 201. The accelerator 160 of the device 100 is operable to accelerate the pusher plate 110 to the target velocity and then rapidly decelerate the pusher plate 110 to cause the first mass 140 and second mass 150 to release from the pusher plate 110. The vehicle airbag deployment device 170 is spaced apart from the pusher plate 110 and accelerator 160 and is positioned facing the pusher plate 110.

The control system 201 may include at least one processor 202, one or a plurality of memory modules 204, and machine readable instructions 206 stored in the one or more memory modules. Each of the one or more processors 202 may be any device capable of executing machine readable instructions. Accordingly, each of the one or more processors 202 may be a controller, an integrated circuit, a microchip, a computer, or any other computing device. For example, the one or more processors 202 may be processors of a computing device. The one or more processors 202 are communicatively coupled to one or a plurality of communication paths 208 that provides signal interconnectivity between various components of the system 200. Accordingly, the communication paths 208 may communicatively couple any number of processors 202 with one another, and allow the components coupled to the communication paths 208 to operate in a distributed computing environment. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication paths 208 may be formed from any medium that is capable of transmitting a signal such as, for example, conductive wires, conductive traces, optical waveguides, or the like. In some embodiments, the communication paths 208 may facilitate the transmission of wireless signals, such as WiFi, Bluetooth, and the like. Moreover, the communication paths 208 may be formed from a combination of mediums capable of transmitting signals. In one embodiment, the communication paths 208 may comprise a combination of conductive traces, conductive wires, connectors, and buses that cooperate to permit the transmission of electrical data signals to components such as processors (e.g., processor 202, vehicle airbag controller 179, and controller for accelerator 160), memories, sensors (e.g., first sensors 148, second sensors 158), input devices, output devices, and communication devices. Accordingly, the communication paths 208 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Moreover, the one or more memory modules 204 may be coupled to the communication paths 208. The memory modules 204 may be one or more memory modules of a computing device. Further, the one or more memory modules 204 may comprise RAM, ROM, flash memories, hard drives, or any device capable of storing machine readable instructions such that the machine readable instructions can be accessed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 204.

Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring again to FIG. 11, the control system 201 of system 200 may be communicatively coupled to at least the one or more memory modules, the accelerator 160, the vehicle airbag controller 179, and the first sensors 148 through communication paths 208. The control system 201 may also be communicatively coupled to one or more second sensors 158 in the second mass 150 through communication paths 208. The machine readable instructions 206 stored in the one or more memory modules 204, when executed by the processor 202, may cause the system 200 to accelerate the pusher plate 110 to a target velocity, decelerate the pusher plate 110 to cause the first mass 140 and the second mass 150 to release from the pusher plate 110, and deploy the vehicle airbag 172 from the vehicle airbag deployment device 170 (e.g., vehicle airbag module 177) into the ballistic pathway (e.g., first ballistic pathway 164 and second ballistic pathway 166) of the first mass 140, the second mass 150, or both after release of the first mass 140 and the second mass 150 from the pusher plate 110. The machine readable instructions 206, when executed by the processor 202, may also cause the system 200 to measure at least one variable of the first mass 140 using the plurality of first sensors 148 and store information on the at least one variable of the first mass 140 in the one or more memory modules 204. Additionally, the machine readable instructions 206, when executed by the processor 202, may also cause the system 200 to measure at least one variable of the second mass 150 using the plurality of second sensors 158 and store information on the at least one variable of the second mass 150 in the one or more memory modules 204.

Referring again to FIG. 1, a method of testing a vehicle airbag 172 using the devices 100 and systems 200 disclosed herein will now be described in further detail. The method of testing the vehicle airbag 172 according to the present disclosure includes securing the first mass 140 to the pusher plate 110 at a first position. The pusher plate 110 and the first mass 140 may have any feature or characteristic described herein for the pusher plate 110 and first mass 140, respectively. The first mass 140 may be received on the first pin 130 and secured to the pusher plate 110 by the at least one first magnet 134. The method may further include securing the second mass 150 to the pusher plate 110 at a second position. The second mass 150 is separate from the first mass 140 (e.g., not coupled to the first mass 140). The second mass 150 may be received on the second pin 132 and secured to the pusher plate 110 by the at least one second magnet 136. The method further includes accelerating the pusher plate 110 to the target velocity and then decelerating the pusher plate 110 to cause the first mass 140 and the second mass 150 to release from the pusher plate 110. The pusher plate 110 may be accelerated and decelerated by the accelerator 160 which is operatively coupled to the pusher plate. The method further includes deploying the vehicle airbag 172 in a ballistic pathway of the first mass 140, the second mass 150, or both released from the pusher plate 110. When released, the first mass 140 and the second mass 150 may free flight along first ballistic pathway 164 and second ballistic pathway 166, respectively, and into contact with the vehicle airbag 172.

The method may further include changing a position of the first mass 140, a position of the second mass 150, or both to change the geometry of contact between the vehicle airbag 172 and the first mass 140, the second mass 150, or both. Changing the position of the first mass 140 may include removing the first pin 130 from the at least one of the plurality of first mounting holes 114, placing the first pin 130 in another of the plurality of first mounting holes 114, changing the position of the at least one first magnet 134, and securing the first mass 140 to the pusher plate 110 at a new location of the first pin 130. Changing the position of the second mass 150 may include removing the second pin 132 from the at least one of the plurality of second mounting holes 116, placing the second pin 132 in another of the plurality of second mounting holes 116, changing the position of the at least one second magnet 136, and securing the second mass 150 to the pusher plate 110 at a new location of the second pin 132. Changing the position of the first mass 140 and/or the second mass 150 may include changing a vertical position (e.g., position in the +/−Z direction of the coordinate axis of FIG. 1) or a horizontal position (e.g., position in the +/−Y direction of the coordinate axis of FIG. 1) of the first mass 140 and/or the second mass 150. Changing the position of the first mass 140 and/or the second mass 150 may further include changing a depth position (e.g., position in the +/−X direction of the coordinate axis) of the first mass 140 and/or second mass 150, such as by installing the spacer plate 180 (FIG. 10A) between the pusher plate 110 and the first mass 140 or second mass 150.

The method may further include increasing or decreasing the target velocity of the pusher plate 110 to change a force or a timing of contact between the vehicle airbag 172 and the first mass 140, the second mass 150, or both. The method may further include increasing or decreasing a time between decelerating the pusher plate 110 (e.g., release of the first mass 140 and second mass 150) and deploying the vehicle airbag 172 to modify a timing of contact between the vehicle airbag 172 and the first mass 140, the second mass 150, or both. Increasing or decreasing a time between decelerating the pusher plate 110 (e.g., release of the first mass 140 and second mass 150) and deploying the vehicle airbag 172 may include modifying the timing of decelerating the pusher plate 110 to modify the time at which the first mass 140, the second mass 150, or both are released from the pusher plate 110. Additionally or alternatively, increasing or decreasing a time between decelerating the pusher plate 110 and deploying the vehicle airbag 172 may include modifying the timing of deploying the vehicle airbag 172.

The method may further include replacing the first mass 140 with a third mass having a different mass than the first mass 140 or replacing the second mass 150 with a fourth mass having a mass different than the second mass 150. Replacing the first mass 140 with the third mass or replacing the second mass 150 with the fourth mass may changes a mass ratio of the mass of the head form to the mass of the body block. The method may further include measuring at least one variable of the first mass 140, the second mass 150, or both during contact of the first mass 140 and the second mass 150 the vehicle airbag 172. The at least one variable of the first mass 140 or second mass 150 may include position, velocity, acceleration/deceleration, force, other variable, or combinations of these variables as a function of time.

It is noted that the terms "about" and "generally" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A device for testing vehicle airbags, the apparatus comprising:
    a pusher plate comprising:
        a plurality of first mounting holes arranged on the pusher plate;
        a plurality of second mounting holes arranged on the pusher plate;
        a first pin received in at least one of the plurality of first mounting holes;
        a second pin received in at least one of the plurality of second mounting holes;
        at least one first magnet operatively coupled to the pusher plate; and at least one second magnet operatively coupled to the pusher plate;

a first mass received on the first pin, wherein the at least one first magnet secures the first mass to the pusher plate when the first mass is received on the first pin prior to and during acceleration of the pusher plate; and a second mass separate from the first mass and received on the second pin, wherein the at least one second magnet secures the second mass to the pusher plate when the second mass is received on the second pin prior to and during acceleration of the pusher plate;

wherein deceleration of the pusher plate causes the first mass and the second mass to release from the pusher plate.

2. The device of claim 1, further comprising an accelerator coupled to the pusher plate, the accelerator operable to accelerate the pusher plate to a target velocity and then rapidly decelerate the pusher plate.

3. The device of claim 2, wherein the accelerator comprises a hydraulic piston or a pneumatic piston.

4. The device of claim 1, further comprising a vehicle airbag deployment device spaced apart from the pusher plate in a direction of acceleration of the pusher plate, wherein the vehicle airbag deployment device is operable to deploy a vehicle airbag in a ballistic pathway of the first mass and the second mass after release of the first mass and the second mass from the pusher plate.

5. The device of claim 1, wherein the first mass comprises a head form.

6. The device of claim 1, wherein the second mass comprises a body block.

7. The device of claim 1, wherein the first pin is repositionable in any one of the plurality of first mounting holes to change a position of the first mass on the pusher plate, and the second pin is repositionable in any one of the plurality of second mounting holes to change a position of the second mass on the pusher plate.

8. The device of claim 1, wherein the at least one first magnet is repositionable in any of the plurality of first mounting holes and the at least one second magnet is repositionable in any of the plurality of second mounting holes.

9. The device of claim 1, wherein:
the pusher plate comprises recessed regions surrounding at least a portion of the first mounting holes, the second mounting holes, or both; and
the at least one first magnet, the at least one second magnet, or both are positioned in the portion of the first mounting holes, the second mounting holes, or both that are surrounded by the recessed regions so that an outer surface of the at least one first magnet, the at least one second magnet, or both is aligned with a front surface of the pusher plate.

10. A system for testing vehicle airbags, the system comprising:
the device of claim 1 coupled to an accelerator operable to accelerate the pusher plate to a target velocity and then rapidly decelerate the pusher plate;
a vehicle airbag deployment device spaced apart from the pusher plate and positioned facing the pusher plate;
a processor communicatively coupled to at least the accelerator and the vehicle airbag deployment device;
one or more memory modules communicatively coupled to the processor; and
machine readable instructions stored in the one or more memory modules that cause the system to perform at least the following when executed by the processor:

accelerate the pusher plate to a target velocity;
decelerate the pusher plate to cause the first mass and the second mass to release from the pusher plate; and
deploy a vehicle airbag from the vehicle airbag deployment device into a ballistic pathway of the first mass, the second mass, or both after release of the first mass and the second mass from the pusher plate.

11. The system of claim 10, wherein the processor is communicatively coupled to a plurality of first sensors coupled to the first mass and a plurality of second sensors coupled to the second mass, wherein the machine readable instructions cause the system to perform at least the following when executed by the processor:
measure at least one variable of the first mass using the plurality of first sensors;
measure at least one variable of the second mass using the plurality of second sensors;
store information on the at least one variable of the first mass in the one or more memory modules; and
store information on the at least one variable of the second mass in the one or more memory modules.

12. A method of testing a vehicle airbag, the method comprising:
securing a first mass to a pusher plate at a first position, the pusher plate comprising:
a plurality of first mounting holes arranged on the pusher plate;
a plurality of second mounting holes arranged on the pusher plate;
a first pin received in at least one of the plurality of first mounting holes;
a second pin received in at least one of the plurality of second mounting holes;
at least one first magnet operatively coupled to the pusher plate; and
at least one second magnet operatively coupled to the pusher plate;
wherein the first mass is received on the first pin and secured to the pusher plate by the at least one first magnet;
securing a second mass to the pusher plate at a second position, wherein the second mass is separate from the first mass and the second mass is received on the second pin and secured to the pusher plate by the at least one second magnet;
accelerating the pusher plate to a target velocity;
decelerating the pusher plate to cause the first mass and the second mass to release from the pusher plate; and
deploying a vehicle airbag in a ballistic pathway of the first mass, the second mass, or both released from the pusher plate.

13. The method of claim 12, further comprising changing a position of the first mass, a position of the second mass, or both to change a geometry of contact between the vehicle airbag and the first mass, the second mass, or both.

14. The method of claim 13, wherein changing the position of the first mass comprises:
removing the first pin from the at least one of the plurality of first mounting holes;
placing the first pin in another of the plurality of first mounting holes;
changing the position of the at least one first magnet; and
securing the first mass to the pusher plate at a new location of the first pin.

15. The method of claim 13, wherein changing the position of the second mass comprises:

removing the second pin from the at least one of the plurality of second mounting holes;

placing the second pin in another of the plurality of second mounting holes;

changing the position of the at least one second magnet; and securing the second mass to the pusher plate at a new location of the second pin.

16. The method of claim 12, further comprising increasing or decreasing the target velocity of the pusher plate to change a force or a timing of contact between the vehicle airbag and the first mass, the second mass, or both.

17. The method of claim 12, further comprising increasing or decreasing a time between decelerating the pusher plate and deploying the vehicle airbag to modify a timing of contact between the vehicle airbag and the first mass, the second mass, or both.

18. The method of claim 17, wherein increasing or decreasing a time between decelerating the pusher plate and deploying the vehicle airbag comprises modifying a timing of decelerating the pusher plate to modify the time at which the first mass, the second mass, or both are released from the pusher plate.

19. The method of claim 12, further comprising replacing the first mass with a third mass having a different mass than the first mass or replacing the second mass with a fourth mass having a mass different than the second mass, wherein replacing the first mass with the third mass or replacing the second mass with the fourth mass changes a mass ratio of the mass of a head form to a mass of a body block.

20. The method of claim 12, further comprising measuring at least one variable of the first mass, the second mass, or both during contact of the first mass, the second mass, or both with the airbag.

* * * * *

UNITED STATES PATENT AND TRADEMARK OFFICE
CERTIFICATE OF CORRECTION

PATENT NO. : 10,876,932 B2
APPLICATION NO. : 16/263732
DATED : December 29, 2020
INVENTOR(S) : Timothy J. Woychowski and Gerritt B. Meyers Page 1 of 1

It is certified that error appears in the above-identified patent and that said Letters Patent is hereby corrected as shown below:

In the Specification

In Column 1, Line(s) 63, after "devices", delete "a" and insert --and--, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*